(12) United States Patent
Jeon et al.

(10) Patent No.: US 12,313,051 B2
(45) Date of Patent: May 27, 2025

(54) LINEAR COMPRESSOR

(71) Applicant: LG Electronics Inc., Seoul (KR)

(72) Inventors: Wooju Jeon, Seoul (KR); Kyungmin Lee, Seoul (KR); Sangik Son, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/011,431

(22) PCT Filed: Jun. 15, 2021

(86) PCT No.: PCT/KR2021/007501
§ 371 (c)(1),
(2) Date: Dec. 19, 2022

(87) PCT Pub. No.: WO2022/149671
PCT Pub. Date: Jul. 14, 2022

(65) Prior Publication Data
US 2023/0332588 A1  Oct. 19, 2023

(30) Foreign Application Priority Data

Jan. 8, 2021  (KR) .................. 10-2021-0002831

(51) Int. Cl.
*F04B 35/04* (2006.01)
*F04B 39/00* (2006.01)
(Continued)

(52) U.S. Cl.
CPC ............... *F04B 35/04* (2013.01); *F16F 9/04* (2013.01); *F16F 9/0418* (2013.01);
(Continued)

(58) Field of Classification Search
CPC .... F04B 35/04; F04B 35/045; F04B 39/0044; F25B 1/02; F16F 9/04; F16F 9/0418; F16F 9/0427
See application file for complete search history.

(56) References Cited

U.S. PATENT DOCUMENTS 1,475,049 A * 11/1923 Church ................. F16F 9/0427
188/129
2,361,575 A * 10/1944 Thompson ................ F16F 9/04
267/31

(Continued)

FOREIGN PATENT DOCUMENTS

KR  20060018788  3/2006
KR  20180074092  7/2018
(Continued)

OTHER PUBLICATIONS

Machine_Translation_of_KR20180074092, 2018, all pages.*

*Primary Examiner* — Christopher S Bobish
(74) *Attorney, Agent, or Firm* — Fish & Richardson P.C.

(57) ABSTRACT

An elastic body and a linear compressor including the same are provided. The linear compressor comprises a cylinder; a piston reciprocating axially inside the cylinder; a drive unit disposed outside the cylinder; a stator cover coupled to a rear of the drive unit; a spring supporter comprising a body portion coupled to a rear of the piston and a seating portion extending outward from the body portion and disposed at a rear of the stator cover; a back plate disposed at a rear of the seating portion; a plurality of first elastic bodies disposed between the stator cover and the seating portion; and a plurality of second elastic bodies disposed between the seating portion and the back plate, wherein the plurality of first elastic bodies and the plurality of second elastic bodies each form a closed space in which a gas is accommodated.

10 Claims, 12 Drawing Sheets

(51) Int. Cl.
*F16F 9/04* (2006.01)
*F25B 1/02* (2006.01)

(52) U.S. Cl.
CPC .............. *F16F 9/0427* (2013.01); *F25B 1/02* (2013.01); *F04B 39/0044* (2013.01)

(56) References Cited

U.S. PATENT DOCUMENTS

| | | | | |
|---|---|---|---|---|
| 2,496,893 | A * | 2/1950 | Smith | F16F 9/0436 267/64.27 |
| 2,704,665 | A * | 3/1955 | Zoltok | F16F 9/0427 267/64.27 |
| 2,920,883 | A * | 1/1960 | Hollert | F16F 9/0427 267/32 |
| 3,522,940 | A * | 8/1970 | Nijhuis | F16F 13/00 267/34 |
| 3,690,540 | A * | 9/1972 | Hardigg | F16F 9/0418 206/521 |
| 3,923,292 | A * | 12/1975 | Madden, Jr. | B60R 19/20 188/377 |
| 4,408,541 | A | 10/1983 | Takai | |
| 5,248,132 | A * | 9/1993 | Jung | F16F 9/049 267/64.19 |
| 6,004,113 | A * | 12/1999 | Vay | F04B 39/127 417/363 |
| 6,126,152 | A * | 10/2000 | Santos | F16F 9/04 267/122 |
| 2006/0110259 | A1* | 5/2006 | Puff | H02K 33/16 417/44.2 |
| 2017/0298913 | A1* | 10/2017 | Kim | F04B 39/00 |
| 2021/0061038 | A1* | 3/2021 | Heon | F16F 9/0427 |

FOREIGN PATENT DOCUMENTS

| | | |
|---|---|---|
| KR | 101981098 | 5/2019 |
| KR | 102087900 | 3/2020 |

* cited by examiner

LINEAR COMPRESSOR

CROSS-REFERENCE TO RELATED APPLICATIONS

This application is a National Stage application under 35 U.S.C. § 371 of International Application No. PCT/KR2021/007501, filed on Jun. 15, 2021, which claims the benefit of Korean Patent Application No. 10-2021-0002831, filed on Jan. 8, 2021. The disclosures of the prior applications are incorporated by reference in their entirety.

TECHNICAL FIELD

The present disclosure relates to a linear compressor. More specifically, the present disclosure relates to a linear compressor for compressing a refrigerant by a linear reciprocating motion of a piston.

BACKGROUND ART

In general, a compressor refers to a device that is configured to receive power from a power generator such as a motor or a turbine and compress a working fluid such as air or refrigerant. More specifically, the compressors are widely used in the whole industry or home appliances, such as for a steam compression refrigeration cycle (hereinafter, referred to as "refrigeration cycle").

The compressors may be classified into a reciprocating compressor, a rotary compressor, and a scroll compressor according to a method of compressing the refrigerant.

The reciprocating compressor uses a method in which a compression space is formed between a piston and a cylinder, and the piston linearly reciprocates to compress a fluid. The rotary compressor uses a method of compressing a fluid by a roller that eccentrically rotates inside a cylinder. The scroll compressor uses a method of compressing a fluid by engaging and rotating a pair of spiral scrolls.

Recently, among the reciprocating compressors, the use of linear compressors that uses a linear reciprocating motion without using a crank shaft is gradually increasing. The linear compressor has advantages in that it has less mechanical loss resulting from switching a rotary motion to the linear reciprocating motion and thus can improve the efficiency, and has a relatively simple structure.

The linear compressor is configured such that a cylinder is positioned in a casing forming a sealed space to form a compression chamber, and a piston covering the compression chamber reciprocates in the cylinder. The linear compressor repeats a process in which a fluid in the sealed space is sucked into the compression chamber while the piston is positioned at a bottom dead center (BDC), and the fluid of the compression chamber is compressed and discharged while the piston is positioned at a top dead center (TDC).

A compression unit and a drive unit (motor) are installed inside the linear compressor. The compression unit performs a process of compressing and discharging a refrigerant while axially reciprocating through a movement generated in the drive unit.

The piston of the linear compressor repeatedly performs a series of processes of sucking the refrigerant into the casing through an intake pipe while reciprocating at high speed inside the cylinder by a resonant spring, and then discharging the refrigerant from a compression space through a forward movement of the piston to move the discharged refrigerant to a condenser through a discharge pipe.

The resonant spring amplifies a vibration implemented by a reciprocating motion of a mover and the piston, thereby achieving effective compression of the refrigerant. Specifically, the resonant spring may be adjusted to a frequency corresponding to the natural frequency of the piston to allow the piston to perform a resonant motion. In the related art linear compressor, a coil spring was generally used as the resonant spring.

The piston of the linear compressor reciprocates in a state of floating by a gas bearing or the like inside the cylinder. In this instance, when a lateral force is generated from the resonant spring supporting the piston at the rear, tilting and/or eccentricity occurs, which causes friction between the mover and a stator to reduce the efficiency of the linear compressor.

Since the coil spring used as the resonant spring in the related art linear compressor is formed in a spiral shape wound in one direction, there is a limit to reducing the lateral force.

The related art linear compressor is provided with a plurality of coil springs. In this instance, a process of aligning the plurality of coil springs in a proper direction was separately required to minimize a problem of the lateral force as described above. Hence, there was also a problem in that the manufacturing time increased and the productivity was reduced.

The coil spring is generally formed of a metal material with elasticity, and a stator cover, a spring supporter, and a back cover, each of which is provided with the coil spring, are also formed of a metal material. Such a contact between metal components may generate a high noise when the linear compressor runs.

In order to reduce the noise, the related art linear compressor uses separate plastic components disposed at a seat portion of the coil spring. Hence, the number of components and the manufacturing cost increased, and there was also a problem in that productivity was lowered due to the use of many components.

In addition, since the coil spring is elongated axially, an axial length of a main body of the linear compressor increases, and thus there was also a problem in that efficiency of an inner space of the linear compressor was reduced.

DISCLOSURE

Technical Problem

An object of the present disclosure is to minimize a lateral force generated by a resonant spring.

Another object of the present disclosure is to reduce a manufacturing time of a linear compressor and improve the productivity by simplifying a process of assembling a resonant spring.

Another object of the present disclosure is to reduce a running noise of a linear compressor using a resonant spring formed of an elastic material not a metal.

Another object of the present disclosure is to reduce the manufacturing cost of a linear compressor and improve the productivity by reducing the number of components required when mounting a resonant spring at the linear compressor.

Another object of the present disclosure is to improve efficiency of an inner space of a linear compressor by reducing a volume occupied by a resonant spring.

Technical Solution

To achieve the above-described and other objects, in one aspect of the present disclosure, there is provided a linear compressor comprising a cylinder; a piston configured to reciprocate axially inside the cylinder; a drive unit disposed outside the cylinder; a stator cover coupled to a rear of the drive unit; a spring supporter comprising a body portion coupled to a rear of the piston and a seating portion configured to extend outward from the body portion and disposed at a rear of the stator cover; a back plate disposed at a rear of the seating portion; a plurality of first elastic bodies disposed between the stator cover and the seating portion; and a plurality of second elastic bodies disposed between the seating portion and the back plate.

In this instance, the plurality of first elastic bodies and the plurality of second elastic bodies each may form a closed space in which a gas is accommodated.

Hence, a lateral force generated by a resonant spring can be minimized.

Further, an assembly process of the resonant spring can be simplified, and hence a manufacturing time of the linear compressor can be reduced and the productivity can be improved.

Since the resonant spring formed of an elastic material not a metal is used, a running noise of the linear compressor can be reduced.

Since the number of components required when mounting the resonant spring at the linear compressor can be reduced, the manufacturing cost can be reduced and the productivity can be improved.

Since a volume occupied by the resonant spring can be reduced, an efficiency of an inner space of the linear compressor can be improved.

The plurality of first elastic bodies may be press-fitted between a rear surface of the stator cover and a front surface of the seating portion, and the plurality of second elastic bodies may be press-fitted between a rear surface of the seating portion and a front surface of the back plate.

The plurality of first elastic bodies may be spaced apart from the body portion.

The linear compressor may further comprise a plurality of bridges configured to extend forward from a part of the back plate and coupled to a rear surface of the stator cover. The plurality of bridges may be disposed radially about an axis. The plurality of first elastic bodies may be disposed in pairs in a circumferential direction between each of the plurality of bridges, and the plurality of second elastic bodies may be disposed in pairs in the circumferential direction between each of the plurality of bridges.

The plurality of first elastic bodies and the plurality of second elastic bodies each may be formed in a sphere shape.

At least one of a rear surface of the stator cover and a front surface of the seating portion and at least one of a rear surface of the seating portion and a front surface of the back plate may comprise a seating groove formed in a portion in which the plurality of first elastic bodies and the plurality of second elastic bodies contact each other.

The seating groove may have a curvature less than curvatures of the plurality of first elastic bodies and the plurality of second elastic bodies.

Each of the plurality of first elastic bodies may comprise a first elastic member in which the closed space is formed, a first front fixing member disposed at a front of the first elastic member, and a first rear fixing member disposed at a rear of the first elastic member. Each of the plurality of second elastic bodies may comprise a second elastic member in which the closed space is formed, a second front fixing member disposed at a front of the second elastic member, and a second rear fixing member disposed at a rear of the second elastic member.

The first elastic member and the second elastic member may be formed of an elastic material. Each of the first front fixing member, the first rear fixing member, the second front fixing member, and the second rear fixing member may be formed of an inelastic material.

A first protrusion may be formed on one of a front surface of the first front fixing member and a rear surface of the stator cover, and a first fixing groove in which the first protrusion is seated may be formed in the other. A second protrusion may be formed on one of a rear surface of the first rear fixing member and a front surface of the seating portion, and a second fixing groove in which the second protrusion is seated may be formed in the other. A third protrusion may be formed on one of a front surface of the second front fixing member and a rear surface of the seating portion, and a third fixing groove in which the third protrusion is seated may be formed in the other. A fourth protrusion may be formed on one of a rear surface of the second rear fixing member and a front surface of the back plate, and a fourth fixing groove in which the fourth protrusion is seated may be formed in the other.

The first protrusion, the second protrusion, the third protrusion, and the fourth protrusion may overlap axially.

A front end of the first front fixing member, a rear end of the first rear fixing member, a front end of the second front fixing member, and a rear end of the second rear fixing member may be formed flat.

A cross section of each of the first elastic member and the second elastic member that are cut in a radial direction may have a circular shape.

To achieve the above-described and other objects, in one aspect of the present disclosure, there is provided a linear compressor comprising a cylinder; a piston configured to reciprocate axially inside the cylinder; a drive unit disposed outside the cylinder; a stator cover coupled to a rear of the drive unit; a spring supporter comprising a body portion coupled to a rear of the piston and a seating portion configured to extend outward from the body portion and disposed at a rear of the stator cover; a back plate disposed at a rear of the seating portion; a first elastic body disposed between the stator cover and the seating portion; and a second elastic body disposed between the seating portion and the back plate.

In this instance, the first elastic body may surround the body portion and may be formed as one body in a circumferential direction, and a shape of the second elastic body may correspond to a shape of the first elastic body. The second elastic body may overlap axially the first elastic body, and each of the first elastic body and the second elastic body may form a closed space in which a gas is accommodated.

The first elastic body may be axially compressed and seated between the stator cover and the seating portion, and the second elastic body may be axially compressed and may be axially compressed and seated between the seating portion and the back plate.

One of a rear surface of the stator cover and a front surface of the seating portion and at least one of a rear surface of the seating portion and a front surface of the back plate may comprise a seating groove formed in a portion in which the first elastic body and the second elastic body contact each other.

The seating groove may have a curvature less than curvatures of the first elastic body and the second elastic body.

The first elastic body may be spaced apart from the body portion.

The linear compressor may further comprise a bridge configured to extend forward from a part of the back plate and coupled to a rear surface of the stator cover, and the bridge may be disposed on radial outsides of the first elastic body and the second elastic body.

The stator cover may comprise a protruding coupling portion protruding outward from the stator cover, and the bridge may be coupled to the protruding coupling portion.

Advantageous Effects

According to the present disclosure, the present disclosure can minimize a lateral force generated by a resonant spring.

The present disclosure can simplify a process of assembling a resonant spring and thus can reduce a manufacturing time of a linear compressor and improve the productivity.

The present disclosure can reduce a running noise of a linear compressor using a resonant spring formed of an elastic material not a metal.

The present disclosure can reduce the manufacturing cost of a linear compressor and improve the productivity by reducing the number of components required when mounting a resonant spring at the linear compressor.

The present disclosure can improve efficiency of an inner space of a linear compressor by reducing a volume occupied by a resonant spring.

MODE FOR INVENTION

Reference will now be made in detail to embodiments of the present disclosure, examples of which are illustrated in the accompanying drawings. Wherever possible, the same reference numbers will be used throughout the drawings to refer to the same or like parts.

It should be understood that when a component is described as being "connected to" or "coupled to" other component, it may be directly connected or coupled to the other component or intervening component(s) may be present.

It will be noted that a detailed description of known arts will be omitted if it is determined that the detailed description of the known arts can obscure embodiments of the present disclosure. The accompanying drawings are used to help easily understand various technical features and it should be understood that embodiments presented herein are not limited by the accompanying drawings. As such, the present disclosure should be understand to extend to any alterations, equivalents and substitutes in addition to those which are particularly set out in the accompanying drawings.

In addition, a term of "disclosure" may be replaced by document, specification, description, etc.

Figure 1:
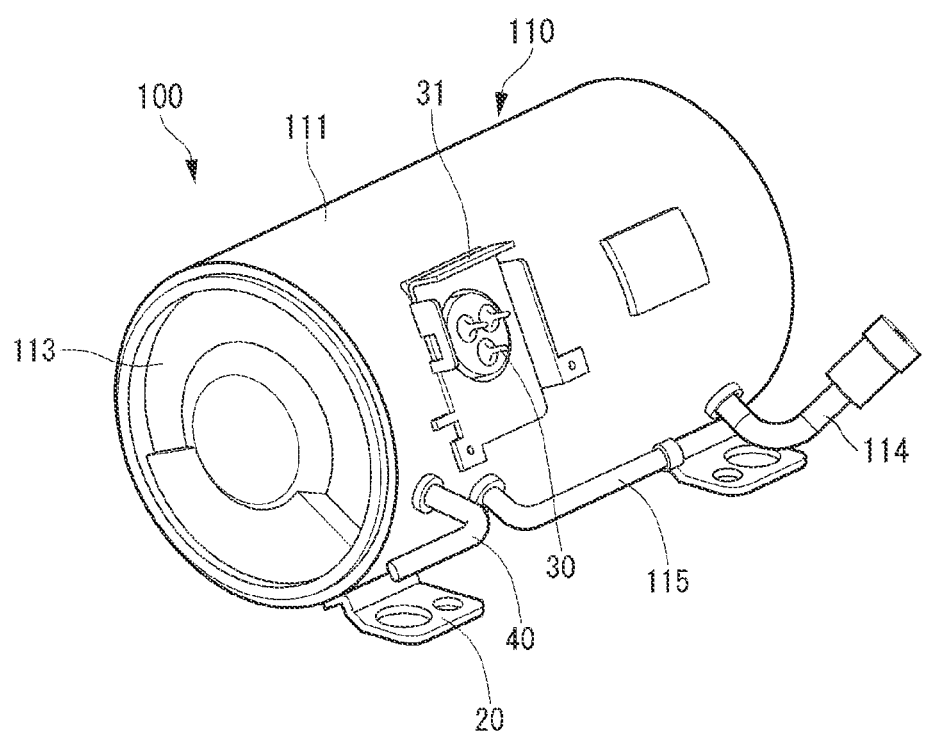
FIG. 1 is a perspective view of a linear compressor according to an embodiment of the present disclosure.

FIG. 1 is a perspective view of a linear compressor 100 according to an embodiment of the present disclosure.

Referring to FIG. 1, the linear compressor 100 according to an embodiment of the present disclosure may include a casing 110. The casing 110 may include a shell 111 and shell covers 112 and 113 coupled to the shell 111. In a broad sense, the shell covers 112 and 113 can be understood as one configuration of the shell 111.

Legs 20 may be coupled to a lower side of the shell 111. The legs 20 may be coupled to a base of a product on which the linear compressor 100 is mounted. For example, the product may include a refrigerator, and the base may include a machine room base of the refrigerator. As another example, the product may include an outdoor unit of an air conditioner, and the base may include a base of the outdoor unit.

The shell 111 may have a substantially cylindrical shape and may be disposed to lie in a horizontal direction or an axial direction. FIG. 1 illustrates that the shell 111 is extended in the horizontal direction and has a slightly low height in a radial direction, by way of example. That is, since the linear compressor 100 can have a low height, there is an advantage in that a height of the machine room can decrease when the linear compressor 100 is installed in, for example, the machine room base of the refrigerator.

A longitudinal central axis of the shell 111 coincides with a central axis of a main body of the linear compressor 100 to be described below, and the central axis of the main body of the linear compressor 100 coincides with a central axis of a cylinder 140 and a piston 150 that constitute the main body of the linear compressor 100.

A terminal 30 may be installed on an outer surface of the shell 111. The terminal 30 may transmit external electric power to a drive unit 130 of the linear compressor 100. More specifically, the terminal 30 may be connected to a lead line of a coil 132b.

A bracket 31 may be installed on the outside of the terminal 30. The bracket 31 may include a plurality of brackets surrounding the terminal 30. The bracket 31 may perform a function of protecting the terminal 30 from an external impact, etc.

Both sides of the shell 111 may be opened. The shell covers 112 and 113 may be coupled to both sides of the opened shell 111. More specifically, the shell covers 112 and 113 may include a first shell cover 112 coupled to one opened side of the shell 111 and a second shell cover 113 coupled to the other opened side of the shell 111. An inner space of the shell 111 may be sealed by the shell covers 112 and 113.

FIG. 1 illustrates that the first shell cover 112 is positioned on the right side of the linear compressor 100, and the second shell cover 113 is positioned on the left side of the linear compressor 100, by way of example. In other words, the first and second shell covers 112 and 113 may be disposed to face each other. It can be understood that the first shell cover 112 is positioned on an intake side of a refrigerant, and the second shell cover 113 is positioned on a discharge side of the refrigerant.

The linear compressor 100 may include a plurality of pipes 114, 115, and 40 that are included in the shell 111 or the shell covers 112 and 113 and can suck, discharge, or inject the refrigerant.

The plurality of pipes 114, 115, and 40 may include an intake pipe 114 that allows the refrigerant to be sucked into the linear compressor 100, a discharge pipe 115 that allows the compressed refrigerant to be discharged from the linear compressor 100, and a supplementary pipe 40 for supplementing the refrigerant in the linear compressor 100.

For example, the intake pipe 114 may be coupled to the first shell cover 112. The refrigerant may be sucked into the linear compressor 100 along the axial direction through the intake pipe 114.

The discharge pipe 115 may be coupled to an outer circumferential surface of the shell 111. The refrigerant sucked through the intake pipe 114 may be compressed while flowing in the axial direction. The compressed refrigerant may be discharged through the discharge pipe 115. The discharge pipe 115 may be disposed closer to the second shell cover 113 than to the first shell cover 112.

The supplementary pipe 40 may be coupled to the outer circumferential surface of the shell 111. A worker may inject the refrigerant into the linear compressor 100 through the supplementary pipe 40.

The supplementary pipe 40 may be coupled to the shell 111 at a different height from the discharge pipe 115 in order to prevent interference with the discharge pipe 115. Herein, the height may be understood as a distance measured from the leg 20 in a vertical direction. Because the discharge pipe 115 and the supplementary pipe 40 are coupled to the outer circumferential surface of the shell 111 at different heights, the work convenience can be attained.

On an inner circumferential surface of the shell 111 corresponding to a location at which the supplementary pipe 40 is coupled, at least a portion of the second shell cover 113 may be positioned adjacently. In other words, at least a portion of the second shell cover 113 may act as a resistance of the refrigerant injected through the supplementary pipe 40.

Thus, a size of the flow path of the refrigerant introduced through the supplementary pipe 40 is configured to decrease by the second shell cover 113 while the refrigerant enters into the inner space of the shell 111, and to increase again while the refrigerant passes through the second shell cover 113. In this process, a pressure of the refrigerant may be reduced to vaporize the refrigerant, and an oil contained in the refrigerant may be separated. Thus, while the refrigerant, from which the oil is separated, is introduced into the piston 150, a compression performance of the refrigerant can be improved. The oil may be understood as a working oil present in a cooling system.

Figure 2:
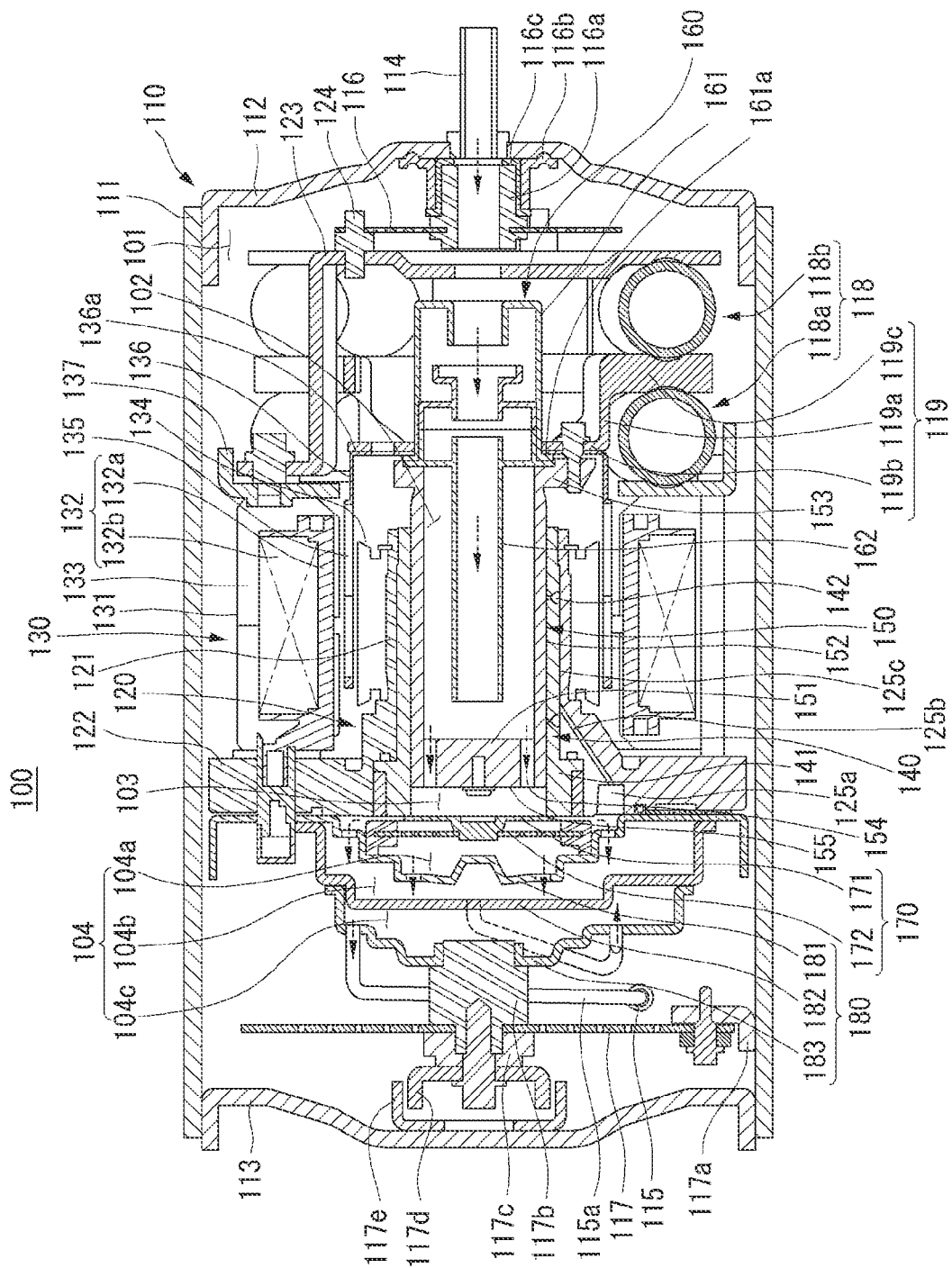
FIG. 2 is a cross-sectional view of a linear compressor according to an embodiment of the present disclosure.

FIG. 2 is a cross-sectional view of the linear compressor 100 according to an embodiment of the present disclosure.

Hereinafter, a compressor according to the present disclosure will be described taking, as an example, the linear compressor 100 that sucks and compresses a fluid while the piston 150 linearly reciprocates, and discharges the compressed fluid.

The linear compressor 100 according to an embodiment of the present disclosure may include the cylinder 140, the piston 150, a muffler unit 160, an elastic body 118, a spring supporter 119, and a back cover 123, but can be implemented except some of these components and does not exclude additional components.

It can be understood that detailed configuration of the linear compressor 100 according to the present disclosure illustrated in FIGS. 3 to 12, in which the description is omitted later, is the same as detailed configuration of the linear compressor 100 according to the present disclosure illustrated in FIG. 2.

The linear compressor 100 may be a component of a refrigeration cycle, and a fluid compressed in the linear compressor 100 may be a refrigerant circulating the refrigeration cycle. The refrigeration cycle may include a condenser, an expander, an evaporator, etc., in addition to a compressor. The linear compressor 100 may be used as a component of the cooling system of the refrigerator, but is not limited thereto. The linear compressor 100 can be widely used in the whole industry.

Referring to FIG. 2, the linear compressor 100 may include a casing 110 and a main body received in the casing 110. The main body of the linear compressor 100 may include a frame 120, the cylinder 140 fixed to the frame 120, the piston 150 that linearly reciprocates inside the cylinder 140, the drive unit 130 that is fixed to the frame 120 and gives a driving force to the piston 150, and the like. Here, the cylinder 140 and the piston 150 may be referred to as compression units 140 and 150.

The linear compressor 100 may include a bearing means for reducing a friction between the cylinder 140 and the piston 150. The bearing means may be an oil bearing or a gas bearing. Alternatively, a mechanical bearing may be used as the bearing means.

The main body of the linear compressor 100 may be elastically supported by support springs 116 and 117 installed at both ends in the casing 110. The support springs 116 and 117 may include a rear support spring 116 supporting the rear of the main body and a front support spring 117 supporting a front of the main body. The support springs 116 and 117 may include a leaf spring. The support springs 116 and 117 can absorb vibrations and impacts generated by a reciprocating motion of the piston 150 while supporting the internal components of the main body of the linear compressor 100.

The casing 110 may define a closed space. The closed space may include an accommodation space 101 in which the sucked refrigerant is received, an intake space 102 which is filled with the refrigerant before the compression, a compression space 103 in which the refrigerant is compressed, and a discharge space 104 which is filled with the compressed refrigerant.

The refrigerant sucked from the intake pipe 114 connected to the rear side of the casing 110 may be filled in the accommodation space 101, and the refrigerant in the intake space 102 communicating with the accommodation space 101 may be compressed in the compression space 103, discharged into the discharge space 104, and discharged to the outside through the discharge pipe 115 connected to the front side of the casing 110.

The casing 110 may include the shell 111 formed in a substantially cylindrical shape that is open at both ends and is long in a transverse direction, the first shell cover 112 coupled to the rear side of the shell 111, and the second shell cover 113 coupled to the front side of the shell 111. Here, it can be understood that the front side is the left side of the figure and is a direction in which the compressed refrigerant is discharged, and the rear side is the right side of the figure and is a direction in which the refrigerant is introduced. Further, the first shell cover 112 and the second shell cover 113 may be formed as one body with the shell 11.

The casing 110 may be formed of a thermally conductive material. Hence, heat generated in the inner space of the casing 110 can be quickly dissipated to the outside.

The first shell cover 112 may be coupled to the shell 111 in order to seal the rear of the shell 111, and the intake pipe 114 may be inserted and coupled to the center of the first shell cover 112.

The rear of the main body of the linear compressor 100 may be elastically supported by the rear support spring 116 in the radial direction of the first shell cover 112.

The rear support spring 116 may include a circular leaf spring. A back cover 123 may be axially elastically supported by a back cover support member 124 formed at an edge of the rear support spring 116. An opened center portion of the rear support spring 116 may be coupled to an intake guide 116a and axially elastically supported.

The intake guide 116a may have a through passage formed therein. The intake guide 116a may be formed in a cylindrical shape. A front outer circumferential surface of the intake guide 116a may be coupled to a central opening of the rear support spring 116, and a rear end of the intake guide 116a may be supported by the first shell cover 112. In this instance, a separate intake support member 116b may be interposed between the intake guide 116a and an inner surface of the first shell cover 112.

A rear side of the intake guide 116a may communicate with the intake pipe 114, and the refrigerant sucked through the intake pipe 114 may pass through the intake guide 116a and may be smoothly introduced into a muffler unit 160 to be described below.

A damping member 116c may be disposed between the intake guide 116a and the intake support member 116b. The damping member 116c may be formed of a rubber material or the like. Hence, a vibration that may occur in the process of sucking the refrigerant through the intake pipe 114 can be prevented from being transmitted to the first shell cover 112.

The second shell cover 113 may be coupled to the shell 111 to seal the front side of the shell 111, and the discharge pipe 115 may be inserted and coupled through a loop pipe 115a. The refrigerant discharged from the compression space 103 may pass through a discharge cover assembly 180 and then may be discharged into the refrigeration cycle through the loop pipe 115a and the discharge pipe 115.

A front side of the main body of the linear compressor 100 may be elastically supported by the front support spring 117 in the radial direction of the shell 111 or the second shell cover 113.

The front support spring 117 may include a circular leaf spring. An opened center portion of the front support spring 117 may be supported by a first support guide 117b in a rearward direction with respect to the discharge cover assembly 180. An edge of the front support spring 117 may be supported by a support bracket 117a in a forward direction with respect to the inner surface of the shell 111 or the inner circumferential surface of the shell 111 adjacent to the second shell cover 113.

Unlike the configuration illustrated in FIG. 2, the edge of the front support spring 117 may be supported in the forward direction with respect to the inner surface of the shell 111 or the inner circumferential surface of the shell 111 adjacent to the second shell cover 113 through a separate bracket (not shown) coupled to the second shell cover 113.

The first support guide 117b may be formed in a cylindrical shape. A cross section of the first support guide 117b may have a plurality of diameters. A front side of the first support guide 117b may be inserted into a central opening of the front support spring 117, and a rear side of the first support guide 117b may be inserted into a central opening of the discharge cover assembly 180. A support cover 117c may be coupled to the front side of the first support guide 117b with the front support spring 117 interposed therebetween. A cup-shaped second support guide 117d that is recessed forward may be coupled to the front side of the support cover 117c. A cup-shaped third support guide 117e that corresponds to the second support guide 117d and is recessed rearward may be coupled to the inside of the second shell cover 113. The second support guide 117d may be inserted into the third support guide 117e and may be supported in the axial direction and/or the radial direction. In this instance, a gap may be formed between the second support guide 117d and the third support guide 117e.

The frame 120 may include a body portion 121 supporting the outer circumferential surface of the cylinder 140, and a first flange portion 122 that is connected to one side of the body portion 121 and supports the drive unit 130. The frame 120 may be elastically supported with respect to the casing 110 by the support springs 116 and 117 together with the drive unit 130 and the cylinder 140.

The body portion 121 may wrap the outer circumferential surface of the cylinder 140. The body portion 121 may be formed in a cylindrical shape. The first flange portion 122 may extend from a front end of the body portion 121 in the radial direction.

The cylinder 140 may be coupled to an inner circumferential surface of the body portion 121. An inner stator 134 may be coupled to an outer circumferential surface of the body portion 121. For example, the cylinder 140 may be pressed and fitted to the inner circumferential surface of the body portion 121, and the inner stator 134 may be fixed using a separate fixing ring (not shown).

An outer stator 131 may be coupled to a rear surface of the first flange portion 122, and the discharge cover assembly 180 may be coupled to a front surface of the first flange portion 122. For example, the outer stator 131 and the discharge cover assembly 180 may be fixed through a mechanical coupling means.

On one side of the front surface of the first flange portion 122, a bearing inlet groove 125a forming a part of the gas bearing may be formed, a bearing communication hole 125b penetrating from the bearing inlet groove 125a to the inner circumferential surface of the body portion 121 may be formed, and a gas groove 125c communicating with the bearing communication hole 125b may be formed on the inner circumferential surface of the body portion 121.

The bearing inlet groove 125a may be recessed to a predetermined depth along the axial direction. The bearing communication hole 125b is a hole having a smaller cross-sectional area than the bearing inlet groove 125a and may be inclined toward the inner circumferential surface of the body portion 121. The gas groove 125c may be formed in an annular shape having a predetermined depth and an axial length on the inner circumferential surface of the body portion 121. Alternatively, the gas groove 125c may be formed on the outer circumferential surface of the cylinder 140 in contact with the inner circumferential surface of the body portion 121, or formed on both the inner circumferential surface of the body portion 121 and the outer circumferential surface of the cylinder 140.

In addition, a gas inlet 142 corresponding to the gas groove 125*c* may be formed on the outer circumferential surface of the cylinder 140. The gas inlet 142 forms a kind of nozzle in the gas bearing.

The frame 120 and the cylinder 140 may be formed of aluminum or an aluminum alloy material.

The cylinder 140 may be formed in a cylindrical shape in which both ends are opened. The piston 150 may be inserted through a rear end of the cylinder 140. A front end of the cylinder 140 may be closed via a discharge valve assembly 170. The compression space 103 may be formed between the cylinder 140, a front end of the piston 150, and the discharge valve assembly 170. Here, the front end of the piston 150 may be referred to as a head portion 151. The volume of the compression space 103 increases when the piston 150 moves backward, and decreases as the piston 150 moves forward. That is, the refrigerant introduced into the compression space 103 may be compressed while the piston 150 moves forward, and may be discharged through the discharge valve assembly 170.

The cylinder 140 may include a second flange portion 141 disposed at the front end. The second flange portion 141 may bend to the outside of the cylinder 140. The second flange portion 141 may extend in an outer circumferential direction of the cylinder 140. The second flange portion 141 of the cylinder 140 may be coupled to the frame 120. For example, the front end of the frame 120 may include a flange groove corresponding to the second flange portion 141 of the cylinder 140, and the second flange portion 141 of the cylinder 140 may be inserted into the flange groove and coupled through a coupling member.

A gas bearing means may be provided to supply a discharge gas to a gap between an outer circumferential surface of the piston 150 and an outer circumferential surface of the cylinder 140 and lubricate between the cylinder 140 and the piston 150 with gas. The discharge gas between the cylinder 140 and the piston 150 may provide a levitation force to the piston 150 to reduce a friction generated between the piston 150 and the cylinder 140.

For example, the cylinder 140 may include the gas inlet 142. The gas inlet 142 may communicate with the gas groove 125*c* formed on the inner circumferential surface of the body portion 121. The gas inlet 142 may pass through the cylinder 140 in the radial direction. The gas inlet 142 may guide the compressed refrigerant introduced in the gas groove 125*c* between the inner circumferential surface of the cylinder 140 and the outer circumferential surface of the piston 150. Alternatively, the gas groove 125*c* may be formed on the outer circumferential surface of the cylinder 140 in consideration of the convenience of processing.

An entrance of the gas inlet 142 may be formed relatively widely, and an exit of the gas inlet 142 may be formed as a fine through hole to serve as a nozzle. The entrance of the gas inlet 142 may further include a filter (not shown) blocking the inflow of foreign matter. The filter may be a metal mesh filter, or may be formed by winding a member such as fine thread.

The plurality of gas inlets 142 may be independently formed. Alternatively, the entrance of the gas inlet 142 may be formed as an annular groove, and a plurality of exits may be formed along the annular groove at regular intervals. The gas inlet 142 may be formed only at the front side based on the axial direction center of the cylinder 140. On the contrary, the gas inlet 142 may be formed at the rear side based on the axial direction center of the cylinder 140 in consideration of the sagging of the piston 150.

The piston 150 is inserted into the opened rear end of the cylinder 140 and is provided to seal the rear of the compression space 103.

The piston 150 may include a head portion 151 and a guide portion 152. The head portion 151 may be formed in a disc shape. The head portion 151 may be partially open. The head portion 151 may partition the compression space 103. The guide portion 152 may extend rearward from an outer circumferential surface of the head portion 151. The guide portion 152 may be formed in a cylindrical shape. The inside of the guide portion 152 may be empty, and a front of the guide portion 152 may be partially sealed by the head portion 151. A rear of the guide portion 152 may be opened and connected to the muffler unit 160. The head portion 151 may be provided as a separate member coupled to the guide portion 152. Alternatively, the head portion 151 and the guide portion 152 may be formed as one body.

The piston 150 may include an intake port 154. The intake port 154 may pass through the head portion 151. The intake port 154 may communicate with the intake space 102 and the compression space 103 inside the piston 150. For example, the refrigerant flowing from the receiving space 101 to the intake space 102 in the piston 150 may pass through the intake port 154 and may be sucked into the compression space 103 between the piston 150 and the cylinder 140.

The intake port 154 may extend in the axial direction of the piston 150. The intake port 154 may be inclined in the axial direction of the piston 150. For example, the intake port 154 may extend to be inclined in a direction away from the central axis as it goes to the rear of the piston 150.

A cross section of the intake port 154 may be formed in a circular shape. The intake port 154 may have a constant inner diameter. In contrast, the intake port 154 may be formed as a long hole in which an opening extends in the radial direction of the head portion 151, or may be formed such that the inner diameter becomes larger as it goes to the rear.

The plurality of intake ports 154 may be formed in at least one of the radial direction and the circumferential direction of the head portion 151.

The head portion 151 of the piston 150 adjacent to the compression space 103 may be provided with an intake valve 155 for selectively opening and closing the intake port 154. The intake valve 155 may operate by elastic deformation to open or close the intake port 154. That is, the intake valve 155 may be elastically deformed to open the intake port 154 by the pressure of the refrigerant flowing into the compression space 103 through the intake port 154.

The piston 150 may be connected to a magnet frame 136. The piston 150 may reciprocate forward and backward according to a movement of the magnet frame 136 provided with a magnet 135. The inner stator 134 and the cylinder 140 may be disposed between the magnet 135 and the piston 150. The magnet frame 136 and the piston 150 may be connected to each other by the magnet frame 136 that is formed by detouring the cylinder 140 and the inner stator 134 to the rear.

The muffler unit 160 may be coupled to the rear of the piston 150 to reduce a noise generated in the process of sucking the refrigerant into the piston 150. The refrigerant sucked through the intake pipe 114 may flow into the intake space 102 in the piston 150 via the muffler unit 160.

The muffler unit 160 may include an intake muffler 161 communicating with the receiving space 101 of the casing 110, and an inner guide 162 that is connected to a front of the intake muffler 161 and guides the refrigerant to the intake port 154.

The intake muffler 161 may be positioned behind the piston 150. A rear opening of the intake muffler 161 may be disposed adjacent to the intake pipe 114, and a front end of the intake muffler 161 may be coupled to the rear of the piston 150. The intake muffler 161 may have a flow path formed in the axial direction to guide the refrigerant in the receiving space 101 to the intake space 102 inside the piston 150.

The inside of the intake muffler 161 may include a plurality of noise spaces partitioned by a baffle. The intake muffler 161 may be formed by combining two or more members. For example, a second intake muffler may be press-coupled to the inside of a first intake muffler to form a plurality of noise spaces. In addition, the intake muffler 161 may be formed of a plastic material in consideration of weight or insulation property.

One side of the inner guide 162 may communicate with the noise space of the intake muffler 161, and other side may be deeply inserted into the piston 150. The inner guide 162 may be formed in a pipe shape. Both ends of the inner guide 162 may have the same inner diameter. The inner guide 162 may be formed in a cylindrical shape. Alternatively, an inner diameter of a front end that is a discharge side of the inner guide 162 may be greater than an inner diameter of a rear end opposite the front end.

The intake muffler 161 and the inner guide 162 may be provided in various shapes and may adjust the pressure of the refrigerant passing through the muffler unit 160. The intake muffler 161 and the inner guide 162 may be formed as one body.

The discharge valve assembly 170 may include a discharge valve 171 and a valve spring 172 that is provided on a front side of the discharge valve 171 to elastically support the discharge valve 171. The discharge valve assembly 170 may selectively discharge the compressed refrigerant in the compression space 103. Here, the compression space 103 means a space between the intake valve 155 and the discharge valve 171.

The discharge valve 171 may be disposed to be supportable on the front surface of the cylinder 140. The discharge valve 171 may selectively open and close the front opening of the cylinder 140. The discharge valve 171 may operate by elastic deformation to open or close the compression space 103. The discharge valve 171 may be elastically deformed to open the compression space 103 by the pressure of the refrigerant flowing into the discharge space 104 through the compression space 103. For example, the compression space 103 may maintain a sealed state while the discharge valve 171 is supported on the front surface of the cylinder 140, and the compressed refrigerant of the compression space 103 may be discharged into an opened space in a state where the discharge valve 171 is spaced apart from the front surface of the cylinder 140.

The valve spring 172 may be provided between the discharge valve 171 and the discharge cover assembly 180 to provide an elastic force in the axial direction. The valve spring 172 may be provided as a compression coil spring, or may be provided as a leaf spring in consideration of an occupied space or reliability.

When the pressure of the compression space 103 is equal to or greater than a discharge pressure, the valve spring 172 may open the discharge valve 171 while deforming forward, and the refrigerant may be discharged from the compression space 103 and discharged into a first discharge space 104a of the discharge cover assembly 180. When the discharge of the refrigerant is completed, the valve spring 172 provides a restoring force to the discharge valve 171 and thus can allow the discharge valve 171 to be closed.

A process of introducing the refrigerant into the compression space 103 through the intake valve 155 and discharging the refrigerant of the compression space 103 into the discharge space 104 through the discharge valve 171 is described as follows.

In the process in which the piston 150 linearly reciprocates in the cylinder 140, when the pressure of the compression space 103 is equal to or less than a predetermined intake pressure, the intake valve 155 is opened and thus the refrigerant is sucked into a compression space 103. On the other hand, when the pressure of the compression space 103 exceeds the predetermined intake pressure, the refrigerant of the compression space 103 is compressed in a state in which the intake valve 155 is closed.

When the pressure of the compression space 103 is equal to or greater than the predetermined intake pressure, the valve spring 172 deforms forward and opens the discharge valve 171 connected to the valve spring 172, and the refrigerant is discharged from the compression space 103 to the discharge space 104 of the discharge cover assembly 180. When the discharge of the refrigerant is completed, the valve spring 172 provides a restoring force to the discharge valve 171 and allows the discharge valve 171 to be closed, thereby sealing a front of the compression space 103.

The discharge cover assembly 180 is installed at the front of the compression space 103, forms a discharge space 104 for receiving the refrigerant discharged from the compression space 103, and is coupled to a front of the frame 120 to thereby reduce a noise generated in the process of discharging the refrigerant from the compression space 103. The discharge cover assembly 180 may be coupled to a front of the first flange portion 122 of the frame 120 while receiving the discharge valve assembly 170. For example, the discharge cover assembly 180 may be coupled to the first flange portion 122 through a mechanical coupling member.

An O-ring 166 may be provided between the discharge cover assembly 180 and the frame 120 to prevent the refrigerant in a gasket 165 for thermal insulation and the discharge space 104 from leaking.

The discharge cover assembly 180 may be formed of a thermally conductive material. Therefore, when a high temperature refrigerant is introduced into the discharge cover assembly 180, heat of the refrigerant may be transferred to the casing 110 through the discharge cover assembly 180 and dissipated to the outside of the compressor.

The discharge cover assembly 180 may include one discharge cover, or may be arranged so that a plurality of discharge covers sequentially communicate with each other. When the discharge cover assembly 180 is provided with the plurality of discharge covers, the discharge space 104 may include a plurality of spaces partitioned by the respective discharge covers. The plurality of spaces may be disposed in a front-rear direction and may communicate with each other.

For example, when there are three discharge covers, the discharge space 104 may include a first discharge space 104a between the frame 120 and a first discharge cover 181 coupled to the front side of the frame 120, a second discharge space 104b between the first discharge cover 181 and a second discharge cover 182 that communicates with the first discharge space 104a and is coupled to a front side of the first discharge cover 181, and a third discharge space 104c between the second discharge cover 182 and a third discharge cover 183 that communicates with the second discharge space 104b and is coupled to a front side of the second discharge cover 182.

The first discharge space 104a may selectively communicate with the compression space 103 by the discharge valve 171, the second discharge space 104b may communicate with the first discharge space 104a, and the third discharge space 104c may communicate with the second discharge space 104b. Hence, as the refrigerant discharged from the compression space 103 sequentially passes through the first discharge space 104a, the second discharge space 104b, and the third discharge space 104c, a discharge noise can be reduced, and the refrigerant can be discharged to the outside of the casing 110 through the loop pipe 115a and the discharge pipe 115 communicating with the third discharge cover 183.

The drive unit 130 may include the outer stator 131 that is disposed between the shell 111 and the frame 120 and surrounds the body portion 121 of the frame 120, the inner stator 134 that is disposed between the outer stator 131 and the cylinder 140 and surrounds the cylinder 140, and the magnet 135 disposed between the outer stator 131 and the inner stator 134.

The outer stator 131 may be coupled to the rear of the first flange portion 122 of the frame 120, and the inner stator 134 may be coupled to the outer circumferential surface of the body portion 121 of the frame 120. The inner stator 134 may be spaced apart from the inside of the outer stator 131, and the magnet 135 may be disposed in a space between the outer stator 131 and the inner stator 134.

The outer stator 131 may be provided with a winding coil, and the magnet 135 may include a permanent magnet. The permanent magnet may be comprised of a single magnet with one pole or configured by combining a plurality of magnets with three poles.

The outer stator 131 may include a coil winding body 132 surrounding the axial direction in the circumferential direction, and a stator core 133 stacked while surrounding the coil winding body 132. The coil winding body 132 may include a hollow cylindrical bobbin 132a and a coil 132b wound in a circumferential direction of the bobbin 132a. A cross section of the coil 132b may be formed in a circular or polygonal shape and, for example, may have a hexagonal shape. In the stator core 133, a plurality of lamination sheets may be laminated radially, or a plurality of lamination blocks may be laminated along the circumferential direction.

The front side of the outer stator 131 may be supported by the first flange portion 122 of the frame 120, and the rear side thereof may be supported by a stator cover 137. For example, the stator cover 137 may be provided in a hollow disc shape, a front surface of the stator cover 137 may be supported by the outer stator 131, and a rear surface thereof may be supported by the elastic body 118.

The inner stator 134 may be configured by stacking a plurality of laminations on the outer circumferential surface of the body portion 121 of the frame 120 in the circumferential direction.

One side of the magnet 135 may be coupled to and supported by the magnet frame 136. The magnet frame 136 has a substantially cylindrical shape and may be disposed to be inserted into a space between the outer stator 131 and the inner stator 134. The magnet frame 136 may be coupled to the rear side of the piston 150 to move together with the piston 150.

As an example, a rear end of the magnet frame 136 is bent and extended inward in the radial direction to form a first coupling portion 136a, and the first coupling portion 136a may be coupled to a third flange portion 153 formed behind the piston 150. The first coupling portion 136a of the magnet frame 136 and the third flange portion 153 of the piston 150 may be coupled through a mechanical coupling member.

A fourth flange portion 161a in front of the intake muffler 161 may be interposed between the third flange portion 153 of the piston 150 and the first coupling portion 136a of the magnet frame 136. Thus, the piston 150, the muffler unit 160, the magnet 135, and the magnet frame 136 can linearly reciprocate together in a combined state of one body.

When a current is applied to the drive unit 130, a magnetic flux may be formed in the winding coil, and an electromagnetic force may occur by an interaction between the magnetic flux formed in the winding coil of the outer stator 131 and a magnetic flux formed by the magnet 135 to move the magnet 135. At the same time as the axially reciprocating movement of the magnet 135, the piston 150 connected to the magnet frame 136 may also axially reciprocate integrally with the magnet 135.

The drive unit 130 and the compression units 140 and 150 may be axially supported by the support springs 116 and 117 and the elastic body 118.

The elastic body 118 amplifies the vibration implemented by the reciprocating motion of the magnet 135 and the piston 150 and thus can achieve an effective compression of the refrigerant. More specifically, the elastic body 118 may be adjusted to a frequency corresponding to a natural frequency of the piston 150 and may allow the piston 150 to perform a resonant motion. Further, the elastic body 118 generates a stable movement of the piston 150 and thus can reduce the generation of vibration and noise.

The elastic body 118 may form a closed space P in which the gas is accommodated. At least one of a front end and a rear end of the elastic body 118 may be connected to the mover, and the other may be connected to a stator. For example, the elastic body 118 may include a first elastic body 118a and a second elastic body 118b. The first elastic body 118a may be disposed between the stator cover 137 and a seating portion 119c of the spring supporter 119, and the second elastic body 118b may be disposed between the seating portion 119c of the spring supporter 119 and a back plate 123a. In this instance, a front end of the first elastic body 118a may be connected to the stator cover 137 which is a stator, and a rear end may be connected to the spring supporter 119 which is a mover. Further, a rear end of the second elastic body 118b may be connected to the back plate 123a which is the stator, and a front end may be connected to the spring supporter 119 which is the mover.

In other words, the first elastic body 118a and the second elastic body 118b may be arranged between the stator cover 137 and the back plate 123a which are the stators, and the seating portion 119c of the spring supporter 119 which is the mover may be disposed between the first elastic body 118a and the second elastic body 118b. The elastic body 118 may transfer an elastic force to the spring supporter 119 by the elastic deformation of the first elastic body 118a and the second elastic body 118b.

A natural frequency of the elastic body 118 may be designed to match a resonant frequency of the mover and the piston 150 during the running of the linear compressor 100, thereby amplifying the reciprocating motion of the piston 150. However, because the back cover 123 provided as the stator is elastically supported by the rear support spring 116 in the casing 110, the back cover 123 may not be strictly fixed.

The spring supporter 119 may include a body portion 119a coupled to the rear of the piston 150, the seating portion 119c that extends outward from the body portion 119a and is disposed at the rear of the stator cover 137, and a second coupling portion 119b that is bent radially inward from a front of the body portion 119a. In this instance, the body portion 119a may surround the intake muffler 161.

A front surface of the second coupling portion 119b of the spring supporter 119 may be supported by the first coupling portion 136a of the magnet frame 136. An inner diameter of the second coupling portion 119b of the spring supporter 119 may cover an outer diameter of the intake muffler 161. For example, the second coupling portion 119b of the spring supporter 119, the first coupling portion 136a of the magnet frame 136, and the third flange portion 153 of the piston 150 may be sequentially disposed and then integrally coupled through a mechanical member. In this instance, the description that the fourth flange portion 161a of the intake muffler 161 is interposed between the third flange portion 153 of the piston 150 and the first coupling portion 136a of the magnet frame 136, and they can be fixed together is the same as that described above.

The linear compressor 100 may include the back cover 123. The back cover 123 may include the back plate 123a and a plurality of bridges 123b. The back plate 123a may be disposed at the rear of the seating portion 119c of the spring supporter 119. The plurality of bridges 123b may extend forward from a part of the back plate 123a and may be coupled to a rear surface of the stator cover 137. The plurality of bridges 123b may be disposed radially about an axis. The plurality of bridges 123b may be arranged at regular intervals in the circumferential direction.

In the linear compressor 100 according to an embodiment and another embodiment of the present disclosure, the first elastic body 118a and the second elastic body 118b may be disposed in each space between the plurality of bridges 123b. However, unlike this, in the linear compressor 100 according to yet another embodiment of the present disclosure, since the plurality of bridges 123b are disposed on a radial outside of the first elastic body 118a and the second elastic body 118b, the elastic body 118 may not be disposed in each space between the plurality of bridges 123b.

The compressor 100 may include a plurality of sealing members that can increase a coupling force between the frame 120 and the components around the frame 120.

For example, the plurality of sealing members may include a first sealing member that is interposed at a portion where the frame 120 and the discharge cover assembly 180 are coupled and is inserted into an installation groove provided at the front end of the frame 120, and a second sealing member that is provided at a portion at which the frame 120 and the cylinder 140 are coupled and is inserted into an installation groove provided at an outer surface of the cylinder 140. The second sealing member can prevent the refrigerant of the gas groove 125c between the inner circumferential surface of the frame 120 and the outer circumferential surface of the cylinder 140 from leaking to the outside, and can increase a coupling force between the frame 120 and the cylinder 140. The plurality of sealing members may further include a third sealing member that is provided at a portion at which the frame 120 and the inner stator 134 are coupled and is inserted into an installation groove provided at the outer surface of the frame 120. Here, the first to third sealing members may have a ring shape.

An operation of the linear compressor 100 described above is as follows.

First, when a current is applied to the drive unit 130, a magnetic flux may be formed in the outer stator 131 by the current flowing in the coil 132b. The magnetic flux formed in the outer stator 131 may generate an electromagnetic force, and the magnet 135 with permanent magnetism may linearly reciprocate by the generated electromagnetic force. The electromagnetic force may be alternately generated in a direction (forward direction) in which the piston 150 is directed toward a top dead center (TDC) during a compression stroke, and in a direction (rearward direction) in which the piston 150 is directed toward a bottom dead center (BDC) during an intake stroke. That is, the drive unit 130 may generate a thrust which is a force for pushing the magnet 135 and the piston 150 in a moving direction.

The piston 150 linearly reciprocating inside the cylinder 140 may repeatedly increase or reduce the volume of the compression space 103.

When the piston 150 moves in a direction (rearward direction) of increasing the volume of the compression space 103, a pressure of the compression space 103 may decrease. Hence, the intake valve 155 mounted in front of the piston 150 is opened, and the refrigerant remaining in the intake space 102 may be sucked into the compression space 103 along the intake port 154. The intake stroke may be performed until the piston 150 is positioned in the bottom dead center by maximally increasing the volume of the compression space 103.

The piston 150 reaching the bottom dead center may perform the compression stroke while switching its motion direction and moving in a direction (forward direction) of reducing the volume of the compression space 103. As the pressure of the compression space 103 increases during the compression stroke, the sucked refrigerant may be compressed. When the pressure of the compression space 103 reaches a setting pressure, the discharge valve 171 is pushed out by the pressure of the compression space 103 and is opened from the cylinder 140, and the refrigerant can be discharged into the discharge space 104 through a separation space. The compression stroke can continue while the piston 150 moves to the top dead center at which the volume of the compression space 103 is minimized.

As the intake stroke and the compression stroke of the piston 150 are repeated, the refrigerant introduced into the receiving space 101 inside the linear compressor 100 through the intake pipe 114 may be introduced into the intake space 102 in the piston 150 by sequentially passing the intake guide 116a, the intake muffler 161, and the inner guide 162, and the refrigerant of the intake space 102 may be introduced into the compression space 103 in the cylinder 140 during the intake stroke of the piston 150. After the refrigerant of the compression space 103 is compressed and discharged into the discharge space 104 during the compression stroke of the piston 150, the refrigerant may be discharged to the outside of the linear compressor 100 via the loop pipe 115a and the discharge pipe 115.

Figure 3:
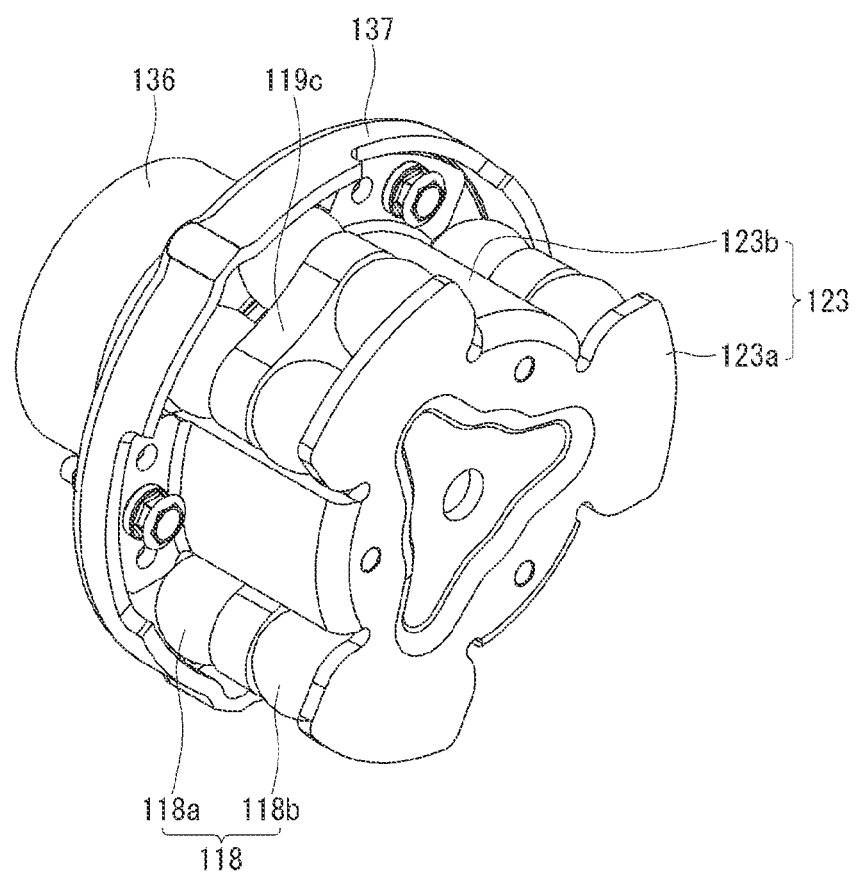
FIG. 3 is a perspective view of a partial configuration of a linear compressor according to an embodiment of the present disclosure.
Figure 4:
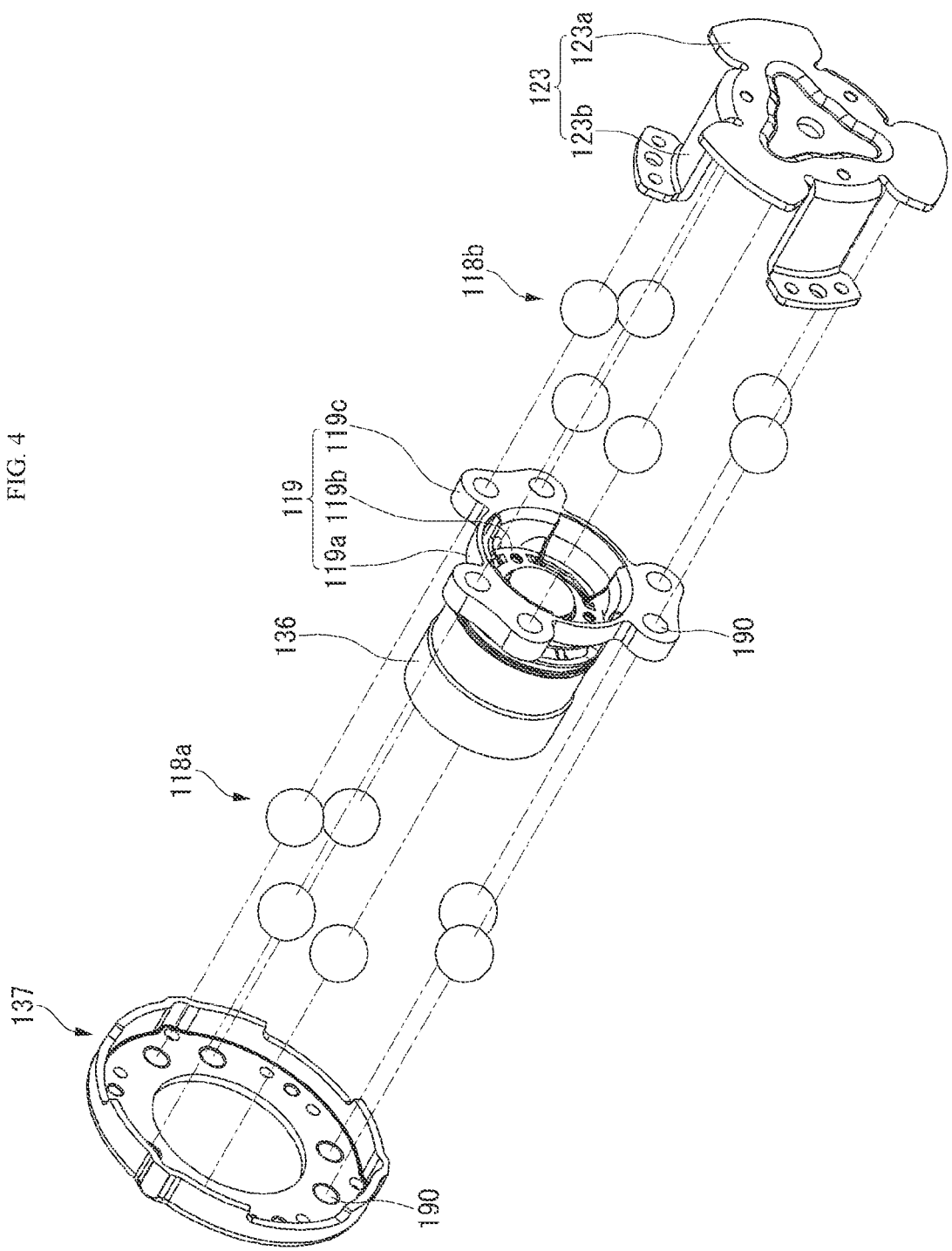
FIG. 4 is an exploded perspective view of a partial configuration of a linear compressor according to an embodiment of the present disclosure.
Figure 5:
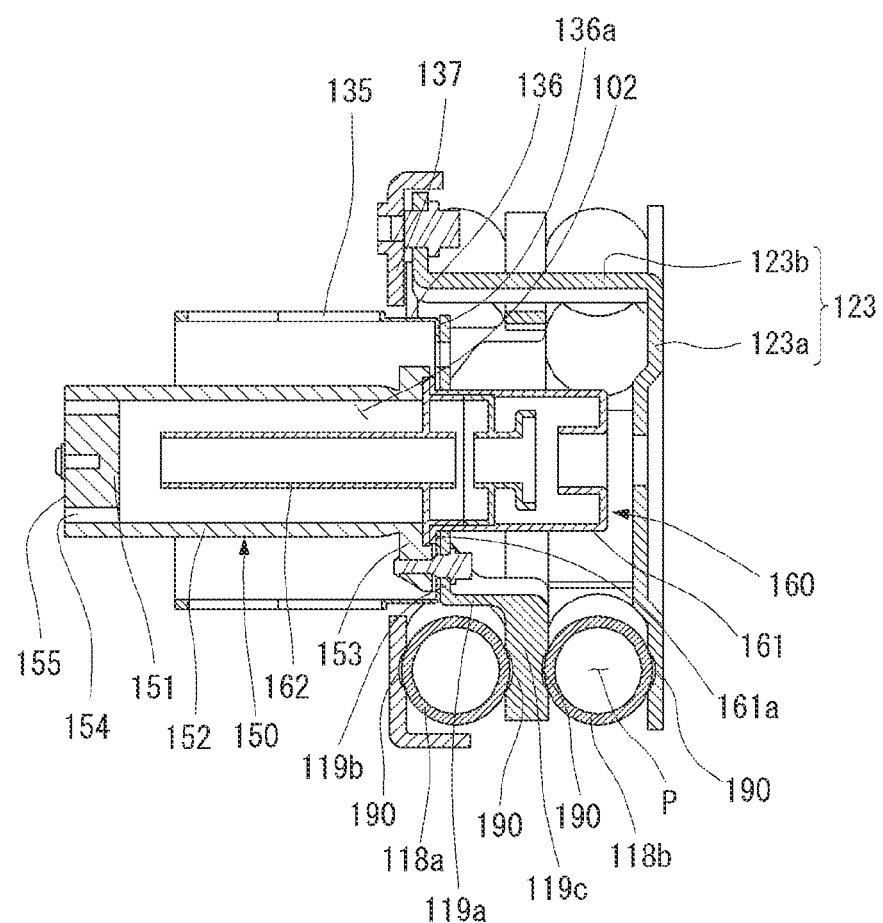
FIG. 5 is a cross-sectional view of a partial configuration of a linear compressor according to an embodiment of the present disclosure.

FIG. 3 is a perspective view of a partial configuration of a linear compressor 100 according to an embodiment of the present disclosure. FIG. 4 is an exploded perspective view of a partial configuration of the linear compressor 100 according to an embodiment of the present disclosure. FIG. 5 is a cross-sectional view of a partial configuration of the linear compressor 100 according to an embodiment of the present disclosure.

The detailed configuration of the linear compressor 100 according to the present disclosure illustrated in FIGS. 3 to 5 which is not described below can be understood to be the same as the detailed configuration of the linear compressor 100 according to an embodiment of the present disclosure illustrated in FIG. 2.

An elastic body 118 may include a plurality of first elastic bodies 118a and a plurality of second elastic bodies 118b. Each of the plurality of first elastic bodies 118a and each of the plurality of second elastic bodies 118b may form a closed space P in which a gas is accommodated. In this instance, each of the plurality of first elastic bodies 118a and each of the plurality of second elastic bodies 118b may be formed of an elastic material.

That is, each of the first elastic body 118a and the second elastic body 118b may be configured such that the gas is filled in the closed space (P) formed inside an outer cover formed of an elastic material, and may form an elastic force by using a restoring force to return to its original state when shapes of the first elastic body 118a and the second elastic body 118b are deformed. The elastic body 118 according to the present disclosure may be referred to as a gas spring.

An outer cover of the elastic body 118 may be formed of an elastic material. For example, the elastic body 118 may be formed of a rubber material having excellent flexibility against pressure change and strong durability. Accordingly, the elastic body 118 of the linear compressor 100 according to an embodiment of the present disclosure may be understood as a rubber ball in which a gas is pressurized and filled. However, the present disclosure is not limited thereto, and the elastic body 118 may be formed of various materials with flexibility that can form the closed space P therein. Since the elastic body 118 is formed of a soft elastic material, a noise generated from a contact between metals can be reduced.

In the related art linear compressor 100, the coil spring used as the resonant spring was formed of a metal material, and the stator cover 137, the spring supporter 119, the back plate 123a, etc. coupled to the coil spring were formed of a metal material. In this case, in order to reduce a noise that may occur during a contact between metals, a separate component of plastic material was used for a coupling area of the coil spring. However, since the elastic body 118 applied to the linear compressor 100 according to the present disclosure is formed of a soft elastic material, a separate component of plastic material may not be required. Therefore, the manufacturing cost can be reduced and productivity can be improved.

The elasticity of the elastic body 118 may be adjusted through a pressure of the gas filled in the closed space P. For example, when the pressure of the gas filled in the closed space P increases, the elasticity of the elastic body 118 may increase, and when the pressure of the gas decreases, the elasticity of the elastic body 118 may decrease. As above, a frequency of the elastic body 118 of the linear compressor 100 according to the present disclosure may be set through the pressure adjustment of the gas inside the closed space without replacement of a separate spring. Therefore, it can easy to control a driving frequency of the linear compressor 100, and it can also easy to respond to a defect related to the frequency of the linear compressor 100.

The outer cover of the elastic body 118 may be formed to a predetermined level of thickness. In this instance, when the outer cover of the elastic body 118 is excessively thick, it may be difficult to adjust the frequency of the elastic body 118 depending on change in the pressure of the gas. Further, when the outer cover of the elastic body 118 is excessively thin, the durability against the gas pressure may be reduced.

The outer cover of the elastic body 118 may have a uniform thickness. When a thickness of an outer cover of a specific portion of the elastic body 118 is formed to be thin or thick, elasticity corresponding to a pressure of gas of the closed space P in the specific portion may be irregularly formed, which causes a lateral force. Thus, in order to form the same elasticity in all the portions in response to the pressure of the gas in the closed space P, it may be preferable that the thickness of the outer cover of the elastic body 118 is uniformly formed.

The gas filled in the closed space P may be nitrogen gas. Since the nitrogen gas has a small volume change with a temperature change, when the nitrogen gas is filled in the closed space P, a change in the pressure inside the closed space P depending on the temperature change can be reduced. Through this, since the elasticity of the elastic body 118 can be maintained constant, the linear compressor 100 can be easily controlled.

When the gas spring is compressed or stretched, the pressure of the gas filled inside acts uniformly on all sides. Therefore, the lateral force generated by each of the first elastic body 118a and the second elastic body 118b can be minimized.

Since there is little lateral force generated by the elastic body 118, a process of aligning assembly angles of the plurality of first elastic bodies 118a and the plurality of second elastic bodies 118b may not be required. Thus, the assembly process can be simplified, and thus the manufacturing time can be reduced and productivity can be improved.

The elastic body 118 of the linear compressor 100 according to the present disclosure does not need to extend axially, and can sufficiently form an axial elastic force by adjusting the pressure of the gas filled in the closed space P. Hence, an axial length of a rear portion of a main body can decrease, and efficiency of an inner space of the linear compressor 100 can be improved.

The elastic body 118 may include the plurality of first elastic bodies 118a. The plurality of first elastic bodies 118a may be disposed between a stator cover 137 and a seating portion 119c. The plurality of first elastic bodies 118a may be press-fitted between a rear surface of the stator cover 137 and a front surface of the seating portion 119c.

In the linear compressor 100 according to an embodiment of the present disclosure, the plurality of first elastic bodies 118a may be understood to be fitted and fixed between the stator cover 137 and the seating portion 119c without a separate coupling member. Thus, an axial length of the plurality of first elastic bodies 118a in a state of being coupled to the linear compressor 100 may be less than an axial length of the plurality of first elastic bodies 118a before being coupled to the linear compressor 100. As above, the plurality of first elastic bodies 118a can be coupled to the linear compressor 100 without a separate coupling member. Therefore, the plurality of first elastic bodies 118a can be easily assembled, and thus the productivity can be improved and the manufacturing cost can be reduced.

The plurality of first elastic bodies 118a may be spaced apart from a body portion 119a of a spring supporter 119. When the elastic body 118 is axially compressed, a radius of a middle portion of the elastic body 118 may increase, and when the elastic body 118 is axially stretched, the radius of the middle portion of the elastic body 118 may decrease. As above, when the linear compressor 100 runs, the radius of the middle portion of the elastic body 118 may repeatedly change.

If the first elastic body 118a is in contact with the body portion 119a of the spring supporter 119, a middle portion of the first elastic body 118a does not uniformly increase and may lean to the radial outside about the axis and increase. This lean phenomenon may generate a lateral force. If the first elastic body 118a is in contact with the body portion 119a of the spring supporter 119, there may repeat a process in which a side surface of the first elastic body 118a is spaced appart from the body portion 119a when the first elastic body 118a is stretched axially, and the side surface of the first elastic body 118a is in contact with the body portion 119a when the first elastic body 118a is again compressed axially. The repeated spacing and contact between the first elastic body 118a and the body portion 119a may cause a noise. Thus, when the first elastic body 118a is disposed to be spaced apart from the body portion 119a of the spring supporter 119, the present disclosure can solve a problem of generating the lateral force and a problem of generating the noise due to the lean phenomenon.

The elastic body 118 may include the plurality of second elastic bodies 118b. The plurality of second elastic bodies 118b may be disposed between the seating portion 119c and the back plate 123a. The plurality of second elastic bodies 118b may be press-fitted between a rear surface of the seating portion 119c and a front surface of the back plate 123a.

In the linear compressor 100 according to an embodiment of the present disclosure, the plurality of second elastic bodies 118b may be understood to be fitted and fixed between the seating portion 119c and the back plate 123a without a separate coupling member. Thus, an axial length of the plurality of second elastic bodies 118b in a state of being coupled to the linear compressor 100 may be less than an axial length of the plurality of second elastic bodies 118b before being coupled to the linear compressor 100. As above, the plurality of second elastic bodies 118b can be coupled to the linear compressor 100 without a separate coupling member. Therefore, the plurality of second elastic bodies 118b can be easily assembled, and thus the productivity can be improved and the manufacturing cost can be reduced.

The plurality of first elastic bodies 118a and the plurality of second elastic bodies 118b may be formed in a sphere shape. This may be understood as a ball shape in which the gas is filled in the closed space P inside an outer cover formed of an elastic material. When the elastic body 118 is formed in a sphere shape, the pressure due to the gas filled in the closed space P acts uniformly on all sides. Therefore, all forces acting in a lateral direction can be canceled out, and thus the lateral force generated from the elastic body 118 can be greatly reduced.

At least one of the rear surface of the stator cover 137 and the front surface of the seating portion 119c and at least one of the rear surface of the seating portion 119c and the front surface of the back plate 123a may include a seating groove 190 formed in a portion in which the plurality of first elastic bodies 118a and the plurality of second elastic bodies 118b contact each other. In order to stably fix the elastic body 118 formed in the sphere shape without a separate coupling member, a groove may be formed at a position where the elastic body 118 is seated. In this instance, it may be preferable that the seating groove 190 is formed on all the rear surface of the stator cover 137, the front surface of the seating portion 119c, the rear surface of the seating portion 119c, and the front surface of the back plate 123a.

Referring to FIG. 4, the seating groove 190 may be formed in a circular shape when viewed from the axial direction. Referring to FIG. 5, the shape of the seating groove 190 may be concave and round when viewed from a cross section.

The seating groove 190 may have a curvature less than curvatures of the plurality of first elastic bodies 118a and the plurality of second elastic bodies 118b. A curvature of a front end and a rear end of the elastic body 118 in a state in which the elastic body 118 is stretched axially may be less than a curvature of the elastic body 118 when the linear compressor 100 does not operate. In this case, when the curvature of the seating groove 190 is less than the curvature of the elastic body 118, the elastic body 118 can be stably seated even in a state in which the elastic body 118 is stretched axially.

However, unlike what is illustrated in FIG. 5, the seating groove 190 may have the curvature corresponding to the curvature of the elastic body 118. In this case, since a gap between the elastic body 118 and the seating groove 190 can be eliminated, a factor of the lateral force generated from the gap can be removed.

The present disclosure is not limited thereto, and the seating groove 190 may not be formed in a round shape. As long as the rear surface of the stator cover 137, a front surface of the seating groove 190, a rear surface of the seating groove 190, and the front surface of the back plate 123a have a groove or a hole capable of seating the elastic body 118, the seating groove 190 may be formed in various shape.

The plurality of first elastic bodies 118a may be disposed in the circumferential direction. Specifically, the plurality of first elastic bodies 118a may be disposed in pairs in the circumferential direction between each of a plurality of bridges 123b that are disposed at regular intervals in the circumferential direction. For example, when the plurality of bridges 123b are three, the plurality of bridges 123b may be disposed at intervals of 120 degrees from each other, and the plurality of first elastic bodies 118a may be six in total since the plurality of first elastic bodies 118a are disposed in pairs between each of the plurality of bridges 123b.

All intervals between the plurality of first elastic bodies 118a formed in pairs in a space between each of the plurality of bridges 123b may be constant. Further, each pair of the plurality of first elastic bodies 118a may be disposed in the circumferential direction at a constant angle from each other about the axis.

In this case, the seating portions 119c of the spring supporter 119 may extend to the radial outside at a position at which the plurality of bridges 123b are not disposed. That is, it may be understood that the plurality of bridges 123b are disposed radially about the axis, the seating portions 119c are extended to the radial outside in a space between each of the plurality of bridges 123b, and the two first elastic bodies 118a are disposed on the front surface of each of the extended seating portions 119c.

Specifically, it may be understood that the first elastic bodies 118a disposed at one side of each of the plurality of first elastic bodies 118a formed in pairs are disposed in the circumferential direction at a constant angle from each other about the axis (e.g., when the plurality of bridges 123b are three, the constant angle is 120 degrees), and the first elastic bodies 118a disposed at the other side are disposed in the circumferential direction at a constant angle from each other about the axis (e.g., when the plurality of bridges 123b are three, the constant angle is 120 degrees).

As above, when viewed from the axial front, the plurality of first elastic bodies 118a may be disposed symmetrically about the axis. Through this, a sum of lateral forces generated from the plurality of first elastic bodies 118a can be minimized.

The plurality of second elastic bodies 118b may be disposed in the circumferential direction. Specifically, the plurality of second elastic bodies 118*b* may be disposed in pairs in the circumferential direction between each of the plurality of bridges 123*b* that are disposed at regular intervals in the circumferential direction. For example, when the plurality of bridges 123*b* are three, the plurality of bridges 123*b* may be disposed at intervals of 120 degrees from each other, and the plurality of second elastic bodies 118*b* may be six in total since the plurality of second elastic bodies 118*b* are disposed in pairs between each of the plurality of bridges 123*b*.

All intervals between the plurality of second elastic bodies 118*b* formed in pairs in a space between each of the plurality of bridges 123*b* may be constant. Further, each pair of the plurality of second elastic bodies 118*b* may be disposed in the circumferential direction at a constant angle from each other about the axis.

In this case, that the seating portions 119*c* of the spring supporter 119 extends to the radial outside at a position at which the plurality of bridges 123*b* are not disposed is the same as the above description related to the plurality of first elastic bodies 118*a*. It may be understood that the two second elastic bodies 118*b* are disposed on the rear surface of each of the extended seating portions 119*c*.

Specifically, it may be understood that the second elastic bodies 118*b* disposed at one side of each of the plurality of second elastic bodies 118*b* formed in pairs are disposed in the circumferential direction at a constant angle from each other about the axis (e.g., when the plurality of bridges 123*b* are three, the constant angle is 120 degrees), and the second elastic bodies 118*b* disposed at the other side are disposed in the circumferential direction at a constant angle from each other about the axis (e.g., when the plurality of bridges 123*b* are three, the constant angle is 120 degrees).

The plurality of second elastic bodies 118*b* may axially overlap the plurality of first elastic bodies 118*a*. It may be understood that the plurality of second elastic bodies 118*b* are disposed at the same position as the plurality of first elastic bodies 118*a* when viewed from the axial direction.

As above, when viewed from the axial front, the plurality of second elastic bodies 118*b* may be disposed symmetrically about the axis. Through this, a sum of lateral forces generated from the plurality of second elastic bodies 118*b* can be minimized.

Figure 6:
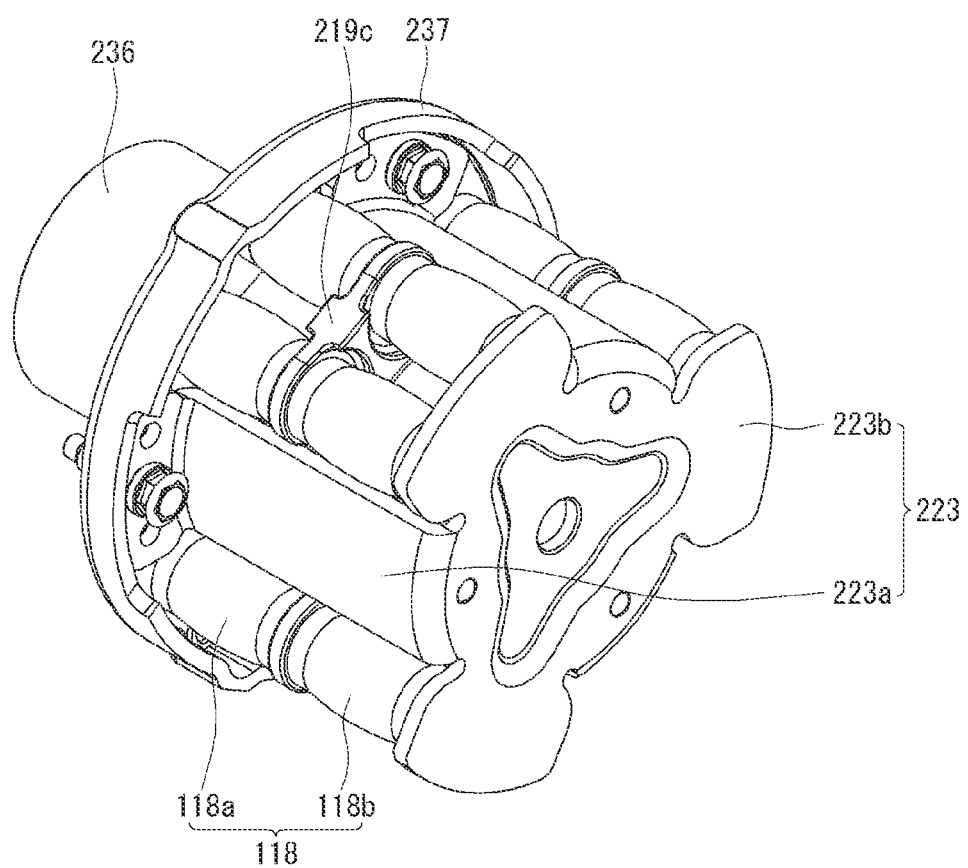
FIG. 6 is a perspective view of a partial configuration of a linear compressor according to another embodiment of the present disclosure.
Figure 7:
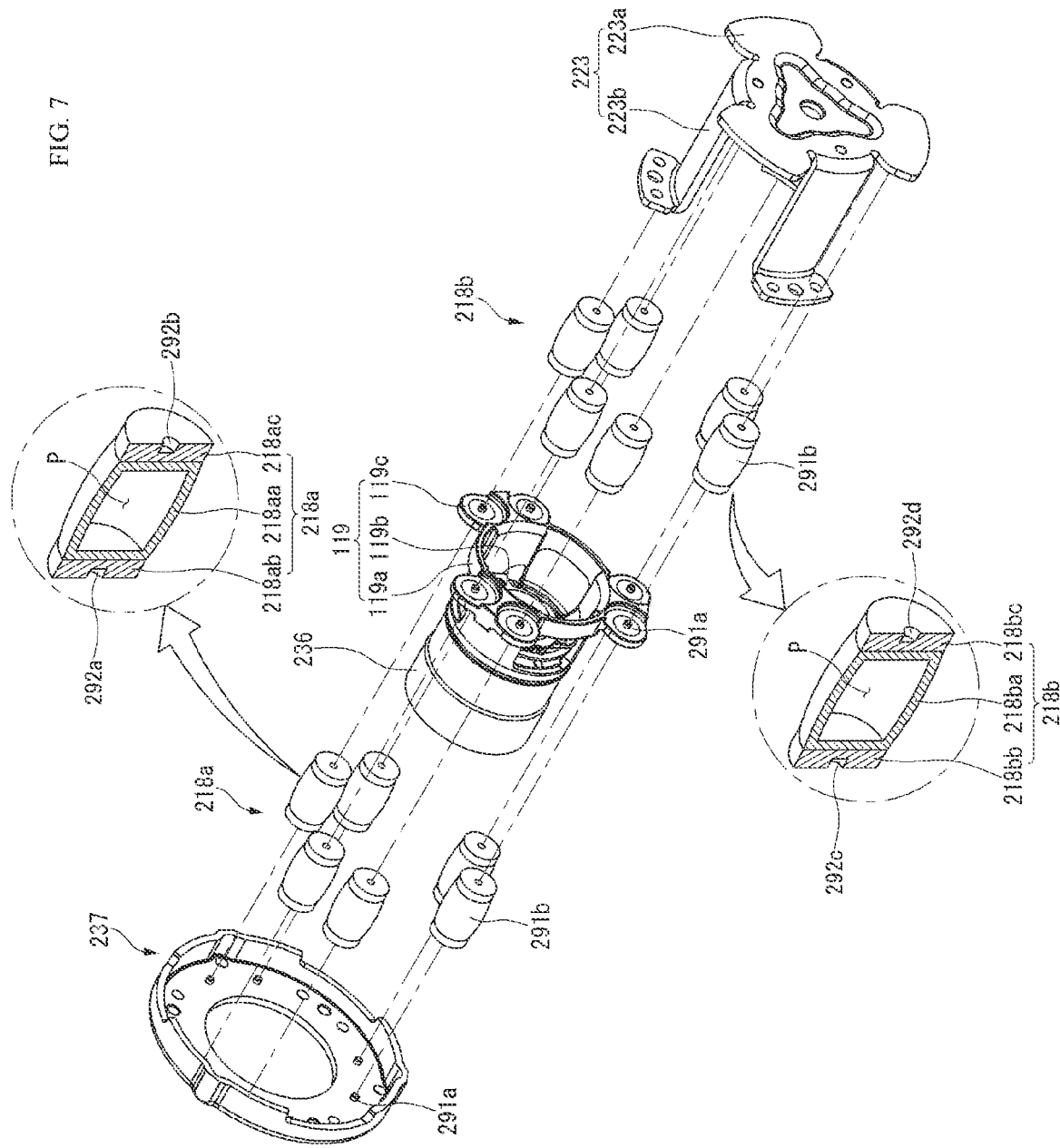
FIG. 7 is an exploded perspective view of a partial configuration of a linear compressor according to another embodiment of the present disclosure.
Figure 8:
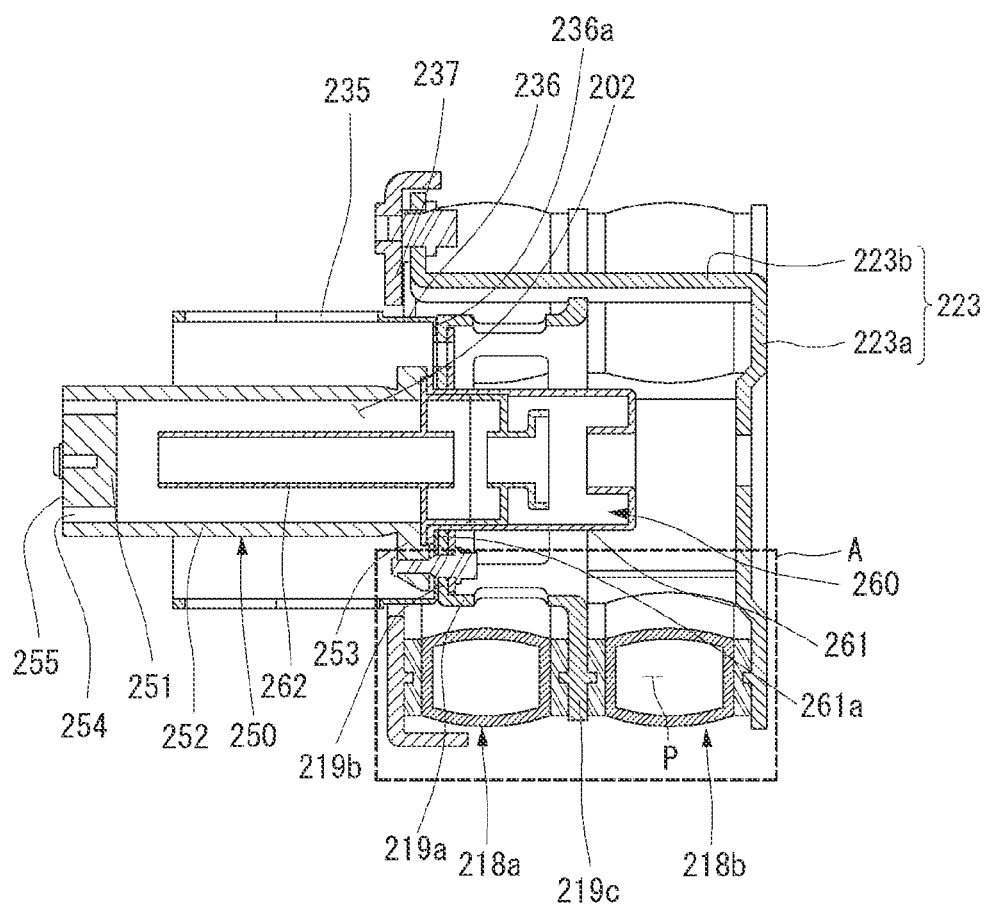
FIG. 8 is a cross-sectional view of a partial configuration of a linear compressor according to another embodiment of the present disclosure.
Figure 9:
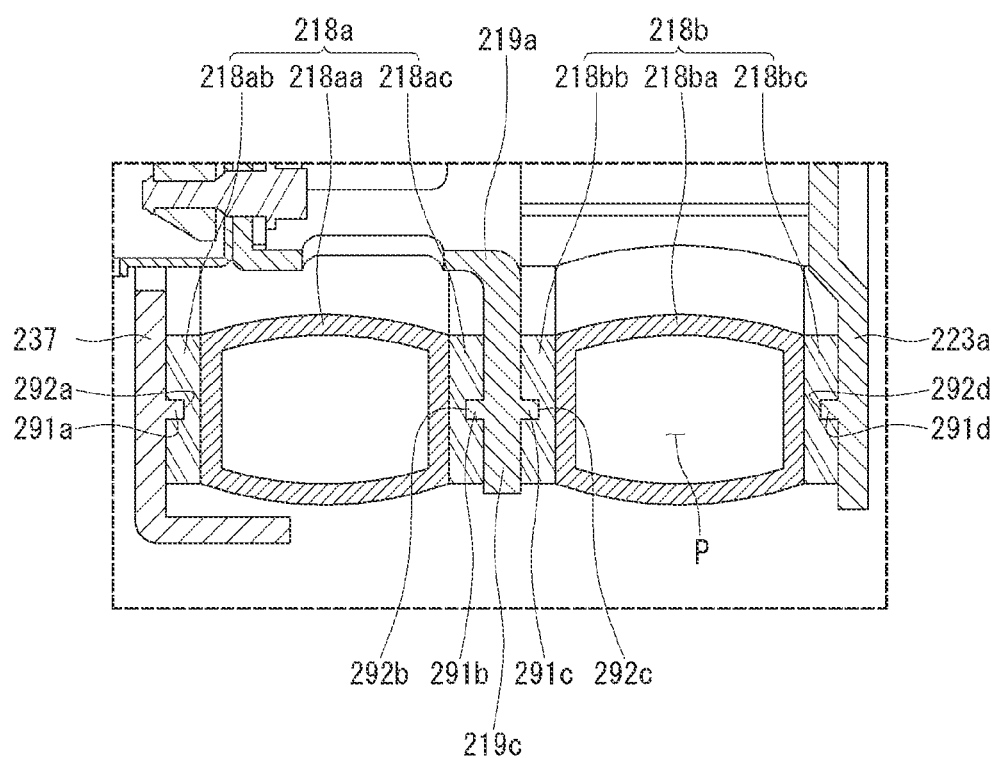
FIG. 9 is an enlarged partial cross-sectional view of a portion A of FIG. 8.

FIG. 6 is a perspective view of a partial configuration of a linear compressor 100 according to another embodiment of the present disclosure. FIG. 7 is an exploded perspective view of a partial configuration of the linear compressor 100 according to another embodiment of the present disclosure. FIG. 8 is a cross-sectional view of a partial configuration of the linear compressor 100 according to another embodiment of the present disclosure. FIG. 9 is an enlarged partial cross-sectional view of a portion A of FIG. 8.

The detailed configuration of the linear compressor 100 according to the present disclosure illustrated in FIGS. 6 to 9 which is not described below can be understood to be the same as the detailed configuration of the linear compressor 100 according to an embodiment of the present disclosure illustrated in FIGS. 2 to 5.

Referring to FIGS. 6 to 9, each of a plurality of first elastic bodies 218*a* may include a first elastic member 218*aa* in which a closed space P is formed, a first front fixing member 218*ab* disposed at a front of the first elastic member 218*aa*, and a first rear fixing member 218*ac* disposed at a rear of the first elastic member 218*aa*.

Each of a plurality of second elastic bodies 218*b* may include a second elastic member 218*ba* in which a closed space P is formed, a second front fixing member 218*bb* disposed at a front of the second elastic member 218*ba*, and a second rear fixing member 218*bc* disposed at a rear of the second elastic member 218*ba*.

Hereinafter, the first elastic member 218*aa* and the second elastic member 218*ba* may be referred to as the elastic members 218*aa* and 218*ba*, and the first front fixing member 218*ab*, the first rear fixing member 218*ac*, the second front fixing member 218*bb*, and the second rear fixing member 218*bc* may be referred to as the fixing members 218*ab*, 218*ac*, 218*bb*, and 218*bc*.

The first elastic member 218*aa* may be formed of an elastic material, and the first front fixing member 218*ab* and the first rear fixing member 218*ac* may be formed of an inelastic material. For example, the first elastic member 218*aa* may be formed of a rubber material which is a soft and elastic material, and the first front fixing member 218*ab* and the first rear fixing member 218*ac* may be formed of a plastic material.

The second elastic member 218*ba* may be formed of an elastic material, and the second front fixing member 218*bb* and the second rear fixing member 218*bc* may be formed of an inelastic material. For example, the second elastic member 218*ba* may be formed of a rubber material which is a soft and elastic material, and the second front fixing member 218*bb* and the second rear fixing member 218*bc* may be formed of a plastic material.

The fixing members 218*ab*, 218*ac*, 218*bb*, and 218*bc* may allow the elastic members 218*aa* and 218*ba* formed of a soft and elastic material to be stably placed between a rear surface of a stator cover 237 and a front surface of a seating portion 219*c* and between a rear surface of the seating portion 219*c* and a front surface of a back plate 223*a*, and may perform a function of uniformly transferring an elastic force generated by the elastic members 218*aa* and 218*ba* to a spring supporter 219.

Outer covers of the elastic members 218*aa* and 218*ba* may be formed to a predetermined level of thickness. In this instance, when the outer covers of the elastic members 218*aa* and 218*ba* are excessively thick, it may be difficult to adjust a frequency of the elastic body 218 depending on change in a pressure of a gas. Further, when the outer covers of the elastic members 218*aa* and 218*ba* are excessively thin, the durability against the gas pressure may be reduced.

The outer covers of the elastic members 218*aa* and 218*ba* may have a uniform thickness. When a thickness of an outer cover of a specific portion of the elastic body 218 is formed to be thin or thick, elasticity corresponding to a pressure of gas of the closed space P in the specific portion may be irregularly formed, which causes a lateral force. Thus, in order to form the same elasticity in all the portions in response to the pressure of the gas in the closed space P, it may be preferable that the thickness of the outer covers of the elastic members 218*aa* and 218*ba* is uniformly formed.

Unlike the description with reference to FIGS. 6 to 9, the first elastic member 218*aa* may be formed in a shape with open front and rear ends, the first front fixing member 218*ab* may be disposed to block the open front end of the first elastic member 218*aa*, and the first rear fixing member 218*ac* may be disposed to block the open rear end of the first elastic member 218*aa*. Further, the second elastic member 218*ba* may be formed in a shape with open front and rear ends, the second front fixing member 218*bb* may be disposed to block the open front end of the second elastic member 218*ba*, and the second rear fixing member 218*bc* may be disposed to block the open rear end of the second elastic member 218*ba*. That is, the elastic members 218*aa* and 218*ba* may form sides of the closed space P, and the fixing members 218*ab*, 218*ac*, 218*bb*, and 218*bc* may form front and rear surfaces of the closed space P.

In this case, in order to secure the airtightness of the closed space P, a separate sealing member (not shown) may be formed at a coupling portion between the elastic members 218*aa* and 218*ba* and the fixing members 218*ab*, 218*ac*, 218*bb*, and 218*bc*.

Referring to FIGS. 6 to 9, a first protrusion 291*a* may be formed on one of a front surface of the first front fixing member 218*ab* and the rear surface of the stator cover 237, and a first fixing groove 292*a* in which the first protrusion 291*a* is seated may be formed in the other. Further, a second protrusion 291*b* may be formed on one of a rear surface of the first rear fixing member 218*ac* and the front surface of the seating portion 219*c*, and a second fixing groove 292*b* in which the second protrusion 291*b* is seated may be formed in the other.

A third protrusion 291*c* may be formed on one of a front surface of the second front fixing member 218*bb* and the rear surface of the seating portion 219*c*, and a third fixing groove 292*c* in which the third protrusion 291*c* is seated may be formed in the other. Further, a fourth protrusion 291*d* may be formed on one of a rear surface of the second rear fixing member 218*bc* and a front surface of the back plate 223*a*, and a fourth fixing groove 292*d* in which the fourth protrusion 291*d* is seated may be formed in the other.

Hereinafter, the first protrusion 291*a*, the second protrusion 291*b*, the third protrusion 291*c*, and the fourth protrusion 291*d* may be referred to as the protrusions 291*a*, 291*b*, 291*c*, and 291*d*, and the first fixing groove 292*a*, the second fixing groove 292*b*, the third fixing groove 292*c*, and the fourth fixing groove 292*d* may be referred to as the fixing grooves 292*a*, 292*b*, 292*c*, and 292*d*.

In the linear compressor 100 according to another embodiment of the present disclosure, since portions contacting the rear surface of the stator cover 237, the front surface of the seating portion 219*c*, the rear surface of the seating portion 219*c*, and the front surface of the back plate 223*a* are the fixing members 218*ab*, 218*ac*, 218*bb*, and 218*bc* formed of an inelastic material, a component for fixing axial movements of the plurality of first elastic bodies 218*a* and the plurality of second elastic bodies 218*b* may be required. Thus, the protrusions 291*a*, 291*b*, 291*c*, and 291*d* or the fixing grooves 292*a*, 292*b*, 292*c*, and 292*d* may be formed in the fixing members 218*ab*, 218*ac*, 218*bb*, and 218*bc*, and the fixing grooves 292*a*, 292*b*, 292*c*, and 292*d* corresponding to the protrusions 291*a*, 291*b*, 291*c*, and 291*d* or the protrusions 291*a*, 291*b*, 291*c*, and 291*d* corresponding to the fixing grooves 292*a*, 292*b*, 292*c*, and 292*d* may be formed in a portion contacting the elastic body 218. When the protrusions 291*a*, 291*b*, 291*c*, and 291*d* and the fixing grooves 292*a*, 292*b*, 292*c*, and 292*d* are engaged with and coupled to each other, the elastic body 218 can be prevented from moving axially.

As a method of placing the protrusions 291*a*, 291*b*, 291*c*, and 291*d* in the fixing grooves 292*a*, 292*b*, 292*c*, and 292*d*, a method of assembling the elastic body 218 to the linear compressor 100 does not require a separate coupling member. Therefore, the manufacturing cost can be improved, and the productivity can be improved through the easy coupling.

Referring to FIG. 8, the protrusions 291*a*, 291*b*, 291*c*, and 291*d* may be formed on the stator cover 237, the front surface of the seating portion 219*c*, the rear surface of the seating portion 219*c*, and the back plate 223*a*, and the fixing grooves 292*a*, 292*b*, 292*c*, and 292*d* may be formed in the fixing members 218*ab*, 218*ac*, 218*bb*, and 218*bc*. However, the present disclosure is not limited thereto, and the fixing grooves 292*a*, 292*b*, 292*c*, and 292*d* may be formed in the stator cover 237, the front surface of the seating portion 219*c*, the rear surface of the seating portion 219*c*, and the back plate 223*a*, and the protrusions 291*a*, 291*b*, 291*c*, and 291*d* may be formed on the fixing members 218*ab*, 218*ac*, 218*bb*, and 218*bc*.

Furthermore, a method of combining the two methods described above may be used. For example, the second protrusion 291*b* may be formed on the first rear fixing member 218*ac*, the second fixing groove 292*b* in which the second protrusion 291*b* is seated may be formed in the front surface of the seating portion 219*c*, the third protrusion 291*c* may be formed on the rear surface of the seating portion 219*c*, and the third fixing groove 292*c* may be formed in the second front fixing member 218*bb*. In this case, the fixing grooves 292*a*, 292*b*, 292*c*, and 292*d* may be formed in the front surface of the seating portion 219*c*, and the protrusions 291*a*, 291*b*, 291*c*, and 291*d* may be formed on the rear surface of the seating portion 219*c*. Therefore, when a forming area of the fixing grooves 292*a*, 292*b*, 292*c*, and 292*d* in the front surface of the seating portion 219*c* is punched or pushed in manufacturing the seating portion 219*c*, the protrusions 291*a*, 291*b*, 291*c*, and 291*d* may be formed on the rear surface of the seating portion 219*c*, accompanying this. Though this, the manufacturing process can be simplified. Even when the protrusions 291*a*, 291*b*, 291*c*, and 291*d* are formed on the front surface of the seating portion 219*c*, and the fixing grooves 292*a*, 292*b*, 292*c*, and 292*d* are formed in the rear surface of the seating portion 219*c*, the above process may be equally applied.

However, since it can be advantageous to improve the productivity to uniformly manufacture the fixing members 218*ab*, 218*ac*, 218*bb*, and 218*bc*, it may be preferable that the fixing grooves 292*a*, 292*b*, 292*c*, and 292*d* or the protrusions 291*a*, 291*b*, 291*c*, and 291*d* are uniformly formed in the first front fixing member 218*ab*, the first rear fixing member 218*ac*, the second front fixing member 218*bb*, and the second rear fixing member 218*bc*.

When the protrusions 291*a*, 291*b*, 291*c*, and 291*d* are formed on the fixing members 218*ab*, 218*ac*, 218*bb*, and 218*bc*, a fixing hole (not shown) may be formed in the stator cover 237, the seating portion 219*c*, and the back plate 223*a* at a position corresponding to the position of the protrusions 291*a*, 291*b*, 291*c*, and 291*d*.

For example, the fixing grooves 292*a*, 292*b*, 292*c*, and 292*d* are not formed in the front surface of the seating portion 219*c* and the rear surface of the seating portion 219*c*, and the fixing hole may be formed to penetrate from the front surface to the rear surface of the seating portion 219*c*. When the fixing grooves 292*a*, 292*b*, 292*c*, and 292*d* are formed, in a process of manufacturing the spring supporter 219 by casting, a part for forming the fixing grooves 292*a*, 292*b*, 292*c*, and 292*d* may need to be separately provided in a mold. However, the fixing hole (not shown) may be formed by manufacturing the casting using an existing mold used for manufacturing the spring supporter 219 and then performing the punching and/or drilling at the formation position of the fixing hole (not shown).

Accordingly, when the elastic body 218 is fixed through the fixing hole (not shown), the existing mold may be used as it is, and the fixing hole (not shown) may be formed through a simple process such as punching and/or drilling. Therefore, the productivity can be improved. This effect can similarly occur in a process of manufacturing not only the seating portion 219*c* of the spring supporter 219 but also the stator cover 237 and the back plate 223*a*.

A cross section of each of the first elastic member 218*aa* and the second elastic member 218*ba* cut in the radial direction may have a circular shape. In order to minimize the lateral force from each elastic body 218, all the lateral forces generated in the closed space P formed inside the first elastic member 218*aa* and the second elastic member 218*ba* must be canceled out. In this instance, when the cross section of each of the first elastic member 218*aa* and the second elastic member 218*ba* cut in the radial direction has the circular shape, all the lateral forces can be canceled out. Therefore, the lateral force generated from each elastic body 218 can be minimized.

The plurality of first elastic bodies 218*a* and the plurality of second elastic bodies 218*b* may be formed in a barrel shape. Specifically, the fixing members 218*ab*, 218*ac*, 218*bb*, and 218*bc* may be formed in a disk shape having a constant thickness in the axial direction, and the elastic members 218*aa* and 218*ba* may be formed in a cylindrical shape in which a radius of a middle portion is greater than radii of front and rear ends. If the elastic members 218*aa* and 218*ba* are formed in a cylindrical shape in which a radius is constant or a radius of a middle portion is less than radii of front and rear ends, when the elastic body 218 is compressed, a phenomenon in which the middle portion is bent in one direction may occur. This may be a factor in generating the lateral force. Thus, it may be preferable that the plurality of first elastic bodies 218*a* and the plurality of second elastic bodies 218*b* are formed in a barrel shape in which a radius of a middle portion is large.

Referring to FIG. 9, the first protrusion 291*a*, the second protrusion 291*b*, the third protrusion 291*c*, and the fourth protrusion 291*d* may be formed at a position overlapped in the axial direction. This may be equally understood that the first fixing groove 292*a*, the second fixing groove 292*b*, the third fixing groove 292*c*, and the fourth fixing groove 292*d* overlap each other in the axial direction. If each of the protrusions 291*a*, 291*b*, 291*c*, and 291*d* is not aligned in the axial direction, a torsion and/or rotational moment may be applied to the spring supporter 219 to generate the lateral force. Thus, when the protrusions 291*a*, 291*b*, 291*c*, and 291*d* or the fixing grooves 292*a*, 292*b*. 292*c*, and 292*d* are aligned in the axial direction, the generation of the lateral force can be minimized.

Figure 10:
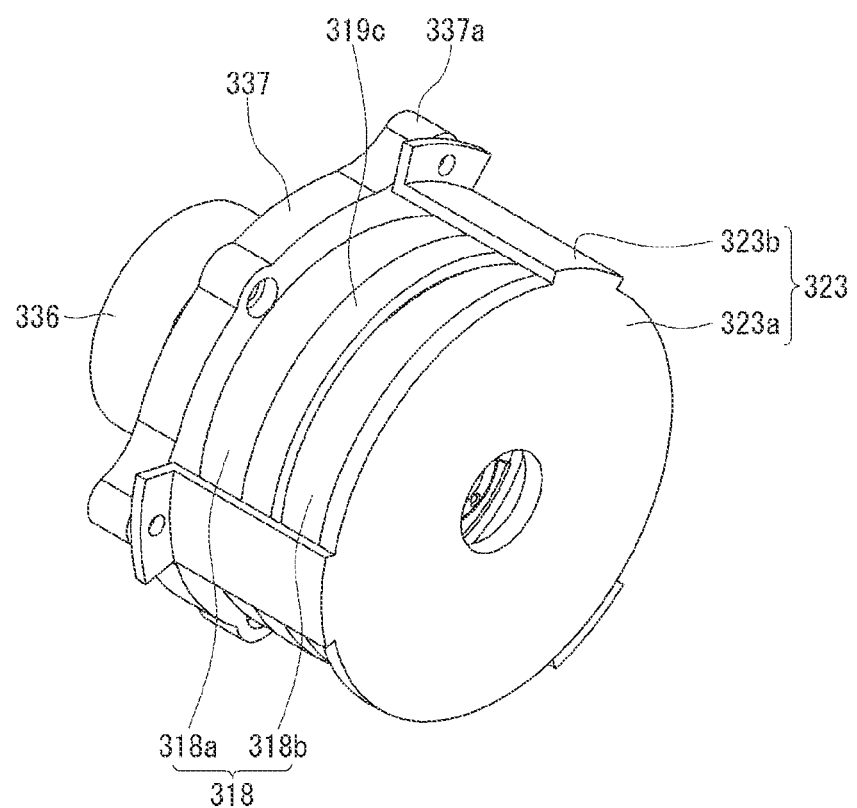
FIG. 10 is a perspective view of a partial configuration of a linear compressor according to yet another embodiment of the present disclosure.
Figure 11:
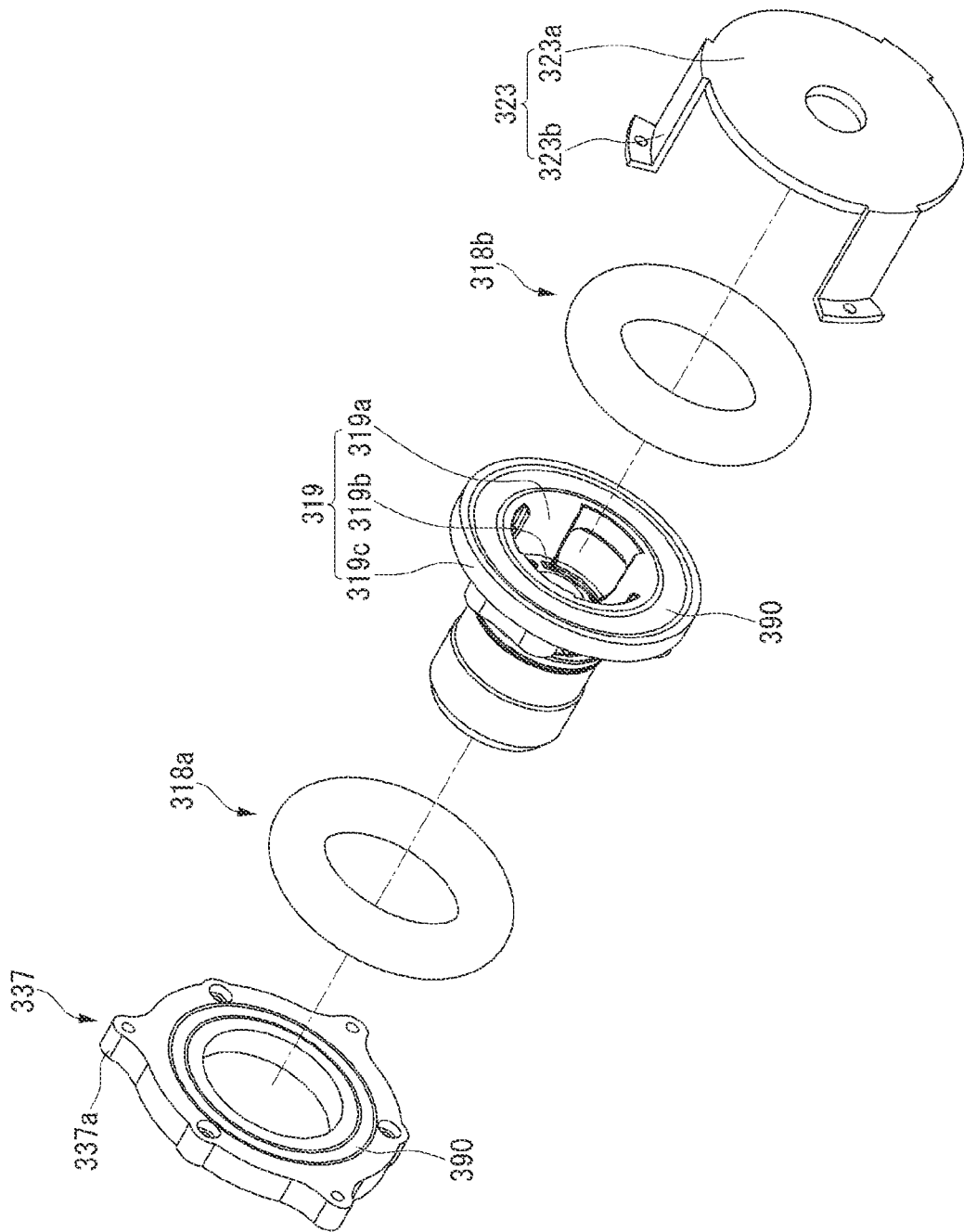
FIG. 11 is an exploded perspective view of a partial configuration of a linear compressor according to yet another embodiment of the present disclosure.
Figure 12:
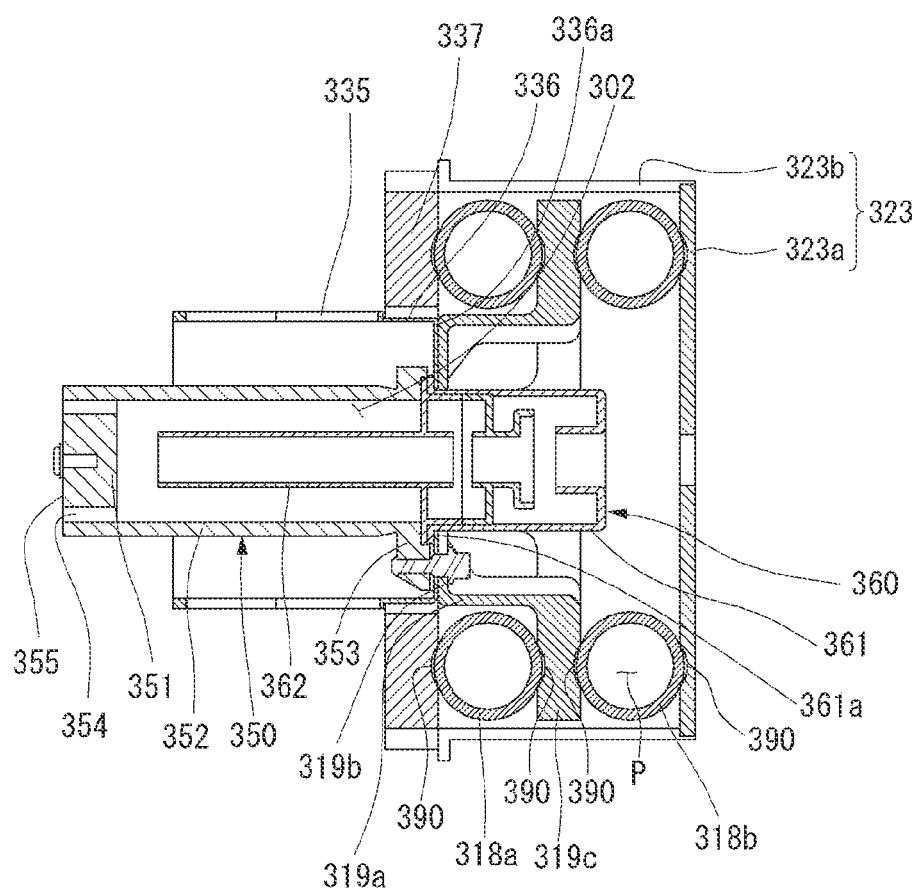
FIG. 12 is a cross-sectional view of a partial configuration of a linear compressor according to yet another embodiment of the present disclosure.

FIG. 10 is a perspective view of a partial configuration of a linear compressor 100 according to yet another embodiment of the present disclosure. FIG. 11 is an exploded perspective view of a partial configuration of the linear compressor 100 according to yet another embodiment of the present disclosure. FIG. 12 is a cross-sectional view of a partial configuration of the linear compressor 100 according to yet another embodiment of the present disclosure.

The detailed configuration of the linear compressor 100 according to the present disclosure illustrated in FIGS. 10 to 12 which is not described below can be understood to be the same as the detailed configuration of the linear compressor 100 according to an embodiment of the present disclosure illustrated in FIGS. 2 to 5.

An elastic body 318 may include a first elastic body 318*a* and a second elastic body 318*b*. The first elastic body 318*a* may be disposed between a stator cover 337 and a seating portion 319*c*. The second elastic body 318*b* may be disposed between the seating portion 319*c* and a back plate 323*a*. The first elastic body 318*a* may surround the seating portion 319*c* of a spring supporter 319 and may be formed as one body in a circumferential direction. A shape of the second elastic body 318*b* may correspond to a shape of the first elastic body 318*a*. The second elastic body 318*b* may axially overlap the first elastic body 318*a*. That is, the first elastic body 318*a* and the second elastic body 318*b* may be understood as a tube shape formed in the circumferential direction about an axis. Each of the first elastic body 318*a* and the second elastic body 318*b* may form a closed space P in which a gas is accommodated.

An outer cover of the elastic body 318 may be formed of an elastic material. For example, the elastic body 318 may be formed of a rubber material having excellent flexibility against pressure change and strong durability. Accordingly, the elastic body 318 of the linear compressor 100 according to yet another embodiment of the present disclosure may be understood as a rubber tube in which a gas is pressurized and filled. However, the present disclosure is not limited thereto, and the elastic body 318 may be formed of various materials with flexibility that can form the closed space P therein. Since the elastic body 318 is formed of a soft elastic material, a noise generated from a contact between metals can be reduced.

The first elastic body 318*a* may be axially compressed and seated between the stator cover 337 and the seating portion 319*c*. The first elastic body 318*a* may be understood to be fitted and fixed between the stator cover 337 and the seating portion 319*c* without a separate coupling member. When the first elastic body 318*a* is coupled in a state being axially compressed, the first elastic body 318*a* can be stably disposed between the stator cover 337 and the seating portion 319*c* due to a restoring force. An axial length of the first elastic body 318*a* in a state of being coupled to the linear compressor 100 may be less than an axial length of the first elastic body 318*a* before being coupled to the linear compressor 100. As above, the first elastic body 318*a* can be coupled to the linear compressor 100 without the separate coupling member. Therefore, the first elastic body 318*a* can be easily assembled, and thus the productivity can be improved and the manufacturing cost can be reduced.

The first elastic body 318*a* may be spaced apart from a body portion 319*a* of the spring supporter 319. When the elastic body 318 is axially compressed, an axial middle portion of the first elastic body 318*a* expands radially, and when the elastic body 318 is axially stretched, the axial middle portion of the first elastic body 318*a* may contract. As above, when the linear compressor 100 runs, a radial size of a middle portion of the elastic body 318 may repeatedly change.

If the first elastic body 318*a* is in contact with the body portion 319*a* of the spring supporter 319, a middle portion of the first elastic body 318*a* does not uniformly increase and may lean to a radial outside about the axis and increase. This lean phenomenon may generate a lateral force. If the first elastic body 318*a* is in contact with the body portion 319*a* of the spring supporter 319, there may repeat a process in which a side surface of the first elastic body 318*a* is spaced apparat from the body portion 319*a* for a while when the first elastic body 318*a* is stretched axially, and the side surface of the first elastic body 118*a* is in contact with the body portion 319*a* when the first elastic body 318*a* is again compressed axially. The repeated spacing and contact between the first elastic body 318*a* and the body portion 319*a* may cause a noise. Thus, it may be preferable that the first elastic body 318*a* is disposed to be spaced apart from the body portion 319*a* of the spring supporter 319.

The second elastic body 318*b* may be axially compressed and seated between the seating portion 319*c* and the back plate 323*a*. The second elastic body 318*b* may be understood to be fitted and fixed between the seating portion 319*c* and the back plate 323*a* without a separate coupling member.

When the second elastic body 318b is coupled in a state being axially compressed, the second elastic body 318b can be stably disposed between the seating portion 319c and the back plate 323a due to a restoring force. An axial length of the second elastic body 318b in a state of being coupled to the linear compressor 100 may be less than an axial length of the second elastic body 318b before being coupled to the linear compressor 100. As above, the second elastic body 318b can be coupled to the linear compressor 100 without the separate coupling member. Therefore, the second elastic body 318b can be easily assembled, and thus the productivity can be improved and the manufacturing cost can be reduced.

The elastic body 318 may include the second elastic body 318b. The second elastic body 318b may be disposed between the seating portion 319c and the back plate 323a. The second elastic body 318b may be axially compressed and seated.

In the linear compressor 100 according to yet another embodiment of the present disclosure, the second elastic body 318b may be understood to be fitted and fixed between the seating portion 319c and the back plate 323a without a separate coupling member. Thus, an axial length of the second elastic body 318b in a state of being coupled to the linear compressor 100 may be less than an axial length of the second elastic body 318b before being coupled to the linear compressor 100. As above, the second elastic body 318b can be coupled to the linear compressor 100 without the separate coupling member. Therefore, the second elastic body 318b can be easily assembled, and thus the productivity can be improved and the manufacturing cost can be reduced.

The seating portion 319c of the spring supporter 319 may extend from the body portion 319a to the radial outside. In this instance, the seating portion 319c may extend in all directions on a plane perpendicular to the axis. That is, the seating portion 319c may have a disk shape formed as one body in the circumferential direction.

In order for the seating portion 319c to receive a uniform elastic force from the elastic body 318, the seating portion 319c and the elastic body 318 needs to uniformly contact each other. That is, a rear end of the first elastic body 318a needs to uniformly contact a front surface of the seating portion 319c, and a front end of the second elastic body 318b needs to uniformly contact a rear surface of the seating portion 319c. Since the elastic body 318 of the linear compressor 100 according to yet another embodiment of the present disclosure has the tube shape extending in the circumferential direction, it may be preferable that the seating portion 319c is formed as one body in the circumferential direction correspondingly to the shape of the elastic body 318. Through this, the present disclosure can prevent generation of the lateral force due to concentration of the elastic force on a part of the seating portion 319c.

At least one of a rear surface of the stator cover 337 and the front surface of the seating portion 319c and at least one of the rear surface of the seating portion 319c and a front surface of the back plate 323a may include a seating groove 390 formed in a portion in which the first elastic body 318a and the second elastic body 318b contact each other. In order to stably fix the elastic body 318 formed in the tube shape without a separate coupling member, it may be preferable that a groove is formed at a position where the elastic body 318 is seated. In this instance, it may be preferable that the seating groove 390 is formed on all the rear surface of the stator cover 337, the front surface of the seating portion 319c, the rear surface of the seating portion 319c, and the front surface of the back plate 323a.

Referring to FIG. 11, the seating groove 390 may be formed in a ring shape correspondingly to the shape of the elastic body 318 when viewed from the axial direction. Referring to FIG. 12, the shape of the seating groove 390 may be concave and round when viewed from a cross section.

The seating groove 390 may have a curvature less than curvatures of the first elastic body 318a and the second elastic body 318b. A curvature of a front end and a rear end of the elastic body 318 in a state in which the elastic body 318 is stretched axially may be less than a curvature of the elastic body 318 when the linear compressor 100 does not operate. In this case, when the curvature of the seating groove 390 is less than the curvature of the elastic body 318, the elastic body 318 can be stably seated even in a state in which the elastic body 318 is stretched axially.

However, unlike what is illustrated in FIG. 12, the seating groove 390 may have the curvature corresponding to the curvature of the elastic body 318. In this case, since a gap between the elastic body 318 and the seating groove 390 can be eliminated, a factor of the lateral force generated from the gap can be removed.

The present disclosure is not limited thereto, and the seating groove 390 may not be formed in a round shape. As long as the rear surface of the stator cover 337, a rear surface of the seating groove 390, and the front surface of the back plate 323a have a groove or a hole capable of seating the elastic body 318, the seating groove 390 may be formed in various shape.

A back cover 323 may include the back plate 323a disposed at the rear of the seating portion 319c of the spring supporter 319 and a bridge 323b that extends forward from a part of the back plate 323a and is coupled to the rear surface of the stator cover 337. In this instance, the bridge 323b may be disposed on a radial outside of the first elastic body 318a and the second elastic body 318b. The bridge 323b may also be disposed on a radial outside of the seating portion 319c.

In the linear compressor 100 according to yet another embodiment of the present disclosure, the stator cover 337 and the back plate 323a are stators, and the seating portion 319c of the spring supporter 319 may be a mover that receives an elastic force from the first elastic body 318a and the second elastic body 318b to reciprocate axially. The back plate 323a may be coupled to the stator cover 337 by the bridge 323b extending forward from a part of the back plate 323a. In this instance, in order to prevent interference between the bridge 323b and the seating portion 319c, it may be preferable that the bridge 323b is disposed on radial outsides of the first elastic body 318a, the second elastic body 318b, and the seating portion 319c.

The stator cover 337 may include a protruding coupling portion 337a protruding outward from the stator cover 337. The bridge 323b may be coupled to the protruding coupling portion 337a. A front end of the bridge 323b may be bent to a radial outside, and a coupling member may pass through and be coupled to a bent portion. Through this, the bridge 323b may be coupled to the stator cover 337. In this instance, in the linear compressor 100 according to yet another embodiment of the present disclosure, since the bridge 323b is disposed on the radial outsides of the first elastic body 318a, the second elastic body 318b, and the seating portion 319c, the protruding coupling portion 337a for the coupling of the bridge 323b may be formed in a portion of an outer end of the stator cover 337 in which the bridge 323b is disposed.

Some embodiments or other embodiments of the present disclosure described above are not exclusive or distinct from each other. Some embodiments or other embodiments of the present disclosure described above can be used together or combined in configuration or function.

For example, configuration "A" described in an embodiment and/or the drawings and configuration "B" described in another embodiment and/or the drawings can be combined with each other. That is, even if the combination between the configurations is not directly described, the combination is possible except in cases where it is described that it is impossible to combine.

The above detailed description is merely an example and is not to be considered as limiting the present disclosure. The scope of the present disclosure should be determined by rational interpretation of the appended claims, and all variations within the equivalent scope of the present disclosure are included in the scope of the present disclosure.

The invention claimed is:

1. A linear compressor comprising:
a cylinder;
a piston configured to reciprocate axially inside the cylinder;
a drive unit disposed outside the cylinder;
a stator cover coupled to a rear of the drive unit;
a spring supporter comprising a body portion coupled to a rear of the piston and a seating portion configured to extend outward from the body portion and disposed at a rear of the stator cover;
a back plate disposed at a rear of the seating portion;
a plurality of first elastic bodies disposed between the stator cover and the seating portion, the plurality of first elastic bodies being in contact with at least one of a rear surface of the stator cover or a front surface of the seating portion; and
a plurality of second elastic bodies disposed between the seating portion and the back plate, the plurality of second elastic bodies being in contact with at least one of a rear surface of the seating portion or a front surface of the back plate,
wherein the plurality of first elastic bodies and the plurality of second elastic bodies each form a closed space in which a gas is accommodated,
wherein the at least one of the rear surface of the stator cover or the front surface of the seating portion defines a first seating groove that is in contact with the plurality of first elastic bodies,
wherein the at least one of the rear surface of the seating portion or the front surface of the back plate defines a second seating groove that is in contact with the plurality of second elastic bodies, and
wherein the first and second seating grooves have a curvature less than curvatures of the plurality of first elastic bodies and the plurality of second elastic bodies.

2. The linear compressor of claim 1, wherein the plurality of first elastic bodies are press-fitted between the rear surface of the stator cover and the front surface of the seating portion, and
wherein the plurality of second elastic bodies are press-fitted between the rear surface of the seating portion and the front surface of the back plate.

3. The linear compressor of claim 1, wherein the plurality of first elastic bodies are spaced apart from the body portion.

4. The linear compressor of claim 1, further comprising a plurality of bridges configured to extend forward from a part of the back plate and coupled to the rear surface of the stator cover,
wherein the plurality of bridges are disposed radially about an axis,
wherein the plurality of first elastic bodies are disposed in pairs in a circumferential direction between each of the plurality of bridges, and
wherein the plurality of second elastic bodies are disposed in pairs in the circumferential direction between each of the plurality of bridges.

5. The linear compressor of claim 1, wherein the plurality of first elastic bodies and the plurality of second elastic bodies each are formed in a sphere shape.

6. A linear compressor comprising:
a cylinder;
a piston configured to reciprocate axially inside the cylinder;
a drive unit disposed outside the cylinder;
a stator cover coupled to a rear of the drive unit;
a spring supporter comprising a body portion coupled to a rear of the piston and a seating portion configured to extend outward from the body portion and disposed at a rear of the stator cover;
a back plate disposed at a rear of the seating portion;
a first elastic body disposed between the stator cover and the seating portion, the first elastic body being in contact with at least one of a rear surface of the stator cover or a front surface of the seating portion; and
a second elastic body disposed between the seating portion and the back plate, the second elastic body being in contact with at least one of a rear surface of the seating portion or a front surface of the back plate,
wherein the first elastic body surrounds the body portion and is formed as one body in a circumferential direction,
wherein a shape of the second elastic body corresponds to a shape of the first elastic body,
wherein the second elastic body overlaps axially the first elastic body,
wherein each of the first elastic body and the second elastic body forms a closed space in which a gas is accommodated,
wherein the at least one of the rear surface of the stator cover or the front surface of the seating portion defines a first seating groove that is in contact with the first elastic body,
wherein the at least one of the rear surface of the seating portion or the front surface of the back plate defines a second seating groove that is in contact with the second elastic body, and
wherein the first and second seating grooves have a curvature less than curvatures of the first elastic body and the second elastic body.

7. The linear compressor of claim 6, wherein the first elastic body is axially compressed and seated between the stator cover and the seating portion, and
wherein the second elastic body is axially compressed and is axially compressed and seated between the seating portion and the back plate.

8. The linear compressor of claim 6, wherein the first elastic body is spaced apart from the body portion.

9. A linear compressor, comprising:
a cylinder;
a piston configured to reciprocate axially inside the cylinder;
a drive unit disposed outside the cylinder;
a stator cover coupled to a rear of the drive unit;

a spring supporter comprising a body portion coupled to a rear of the piston and a seating portion configured to extend outward from the body portion and disposed at a rear of the stator cover;

a back plate disposed at a rear of the seating portion;

a first elastic body disposed between the stator cover and the seating portion;

a second elastic body disposed between the seating portion and the back plate; and a bridge configured to extend forward from a part of the back plate and coupled to a rear surface of the stator cover, wherein the first elastic body surrounds the body portion and is formed as one body in a circumferential direction, wherein a shape of the second elastic body corresponds to a shape of the first elastic body, wherein the second elastic body overlaps axially the first elastic body, wherein each of the first elastic body and the second elastic body forms a closed space in which a gas is accommodated, and wherein the bridge is disposed on radial outsides of the first elastic body and the second elastic body.

10. The linear compressor of claim 9, wherein the stator cover comprises a protruding coupling portion protruding outward from the stator cover, and wherein the bridge is coupled to the protruding coupling portion.

* * * * *